US012069424B2

(12) United States Patent
Zhang et al.

(10) Patent No.: US 12,069,424 B2
(45) **Date of Patent: *Aug. 20, 2024**

(54) VIBRATION REMOVAL APPARATUS AND METHOD FOR DUAL-MICROPHONE EARPHONES

(71) Applicant: SHENZHEN SHOKZ CO., LTD., Guangdong (CN)

(72) Inventors: Lei Zhang, Shenzhen (CN); Fengyun Liao, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/663,665

(22) Filed: May 16, 2022

(65) Prior Publication Data

US 2022/0279268 A1 Sep. 1, 2022

Related U.S. Application Data

(63) Continuation of application No. 17/079,438, filed on Oct. 24, 2020, now Pat. No. 11,356,765, which is a (Continued)

(51) Int. Cl.
*G10K 11/178* (2006.01)
*H04R 1/10* (2006.01)

(52) U.S. Cl.
CPC ......... *H04R 1/1083* (2013.01); *G10K 11/178* (2013.01); *G10K 2210/1081* (2013.01); *G10K 2210/129* (2013.01); *H04R 2410/05* (2013.01)

(58) Field of Classification Search
CPC .. H04R 1/1083; H04R 2410/05; H04R 3/005; H04R 2201/003; H04R 19/04;
(Continued)

(56) References Cited

U.S. PATENT DOCUMENTS 4,442,323 A 4/1984 Yoshida et al.
5,363,452 A 11/1994 Anderson
(Continued)

FOREIGN PATENT DOCUMENTS

CN 102314871 A 1/2012
CN 203840513 U 9/2014
(Continued)

OTHER PUBLICATIONS

Decision on Grant in Russian Application No. 2021134604 mailed on Sep. 23, 2022, 16 pages.
(Continued)

*Primary Examiner* — Carolyn R Edwards
*Assistant Examiner* — Friedrich Fahnert
(74) *Attorney, Agent, or Firm* — METIS IP LLC

(57) ABSTRACT

The present disclosure provides a microphone apparatus. The microphone apparatus may include a microphone and a vibration sensor. The microphone may be configured to receive a first signal including a voice signal and a first vibration signal. The vibration sensor may be configured to receive a second vibration signal. And the microphone and the vibration sensor are configured such that the first vibration signal may be offset with the second vibration signal.

20 Claims, 17 Drawing Sheets

Related U.S. Application Data continuation of application No. PCT/CN2018/084588, filed on Apr. 26, 2018.

(58) Field of Classification Search
CPC .... H04R 3/06; H04R 2460/13; H04R 1/1091; H04R 1/28; H04R 3/02; H04R 1/10; H04R 1/2869; H04R 3/04; G10K 11/178; G10K 2210/1081; G10K 2210/129
USPC .......................................................... 381/71.6
See application file for complete search history.

(56) References Cited

U.S. PATENT DOCUMENTS

| | | | | |
|---|---|---|---|---|
| 7,146,014 | B2 | 12/2006 | Hannah | |
| 2003/0012395 | A1 | 1/2003 | Fukuda | |
| 2003/0085070 | A1 | 5/2003 | Wickstrom | |
| 2004/0131219 | A1 | 7/2004 | Polk, Jr. | |
| 2005/0063553 | A1 | 3/2005 | Ozawa | |
| 2005/0234715 | A1 | 10/2005 | Ozawa | |
| 2005/0251952 | A1 | 11/2005 | Johnson | |
| 2007/0041588 | A1 | 2/2007 | Lin | |
| 2007/0047744 | A1 | 3/2007 | Harney et al. | |
| 2007/0253570 | A1 | 11/2007 | Fukumoto et al. | |
| 2009/0112051 | A1 | 4/2009 | Miller, III | |
| 2009/0175477 | A1 | 7/2009 | Suzuki et al. | |
| 2011/0179876 | A1 | 7/2011 | Kasai et al. | |
| 2012/0076322 | A1 | 3/2012 | Kimura et al. | |
| 2012/0224723 | A1 | 9/2012 | Akino | |
| 2012/0286765 | A1 | 11/2012 | Van Den Heuvel et al. | |
| 2013/0018218 | A1 | 1/2013 | Haller et al. | |
| 2013/0208923 | A1 | 8/2013 | Suvanto | |
| 2016/0050499 | A1 | 2/2016 | Bolognia et al. | |
| 2016/0134978 | A1 | 5/2016 | Lafort et al. | |
| 2016/0150337 | A1* | 5/2016 | Nandy | G10L 21/0208 381/66 |
| 2016/0165357 | A1* | 6/2016 | Morishita | H04R 19/04 381/170 |
| 2016/0295328 | A1* | 10/2016 | Park | H04R 19/04 |
| 2017/0061953 | A1 | 3/2017 | An et al. | |
| 2017/0111734 | A1 | 4/2017 | Macours | |
| 2018/0077507 | A1 | 3/2018 | Bernal Castillo et al. | |
| 2020/0286462 | A1 | 9/2020 | Nielsen | |
| 2021/0281954 | A1* | 9/2021 | Qi | H04R 9/02 |

FOREIGN PATENT DOCUMENTS

| | | | |
|---|---|---|---|
| CN | 204836575 | U | 12/2015 |
| DE | 3921784 | A1 | 1/1991 |
| JP | 3045202 | U | 1/1998 |
| JP | 2007174165 | A | 7/2007 |
| JP | 2010114878 | A | 5/2010 |
| JP | 2011176533 | A | 9/2011 |
| WO | 9522878 | A2 | 8/1995 |
| WO | 2012025794 | A1 | 3/2012 |
| WO | 2015142893 | A1 | 9/2015 |

OTHER PUBLICATIONS

International Search Report in PCT/CN2018/084588 mailed on Oct. 12, 2018, 6 pages.
Written Opinion in PCT/CN2018/084588 mailed on Oct. 12, 2018, 10 pages.
The Extended European Search Report in European Application No. 18916724.0 mailed on Feb. 23, 2021, 13 pages.
The Examination Report in Indian Application No. 202017046619 mailed on Jun. 23, 2021, 5 pages.
The Office Action in Russian Application No. 2020137933 mailed on Jun. 10, 2021, 18 pages.
Notice of Reasons for Rejection in Japanese Application No. 2020560320 mailed on Dec. 20, 2021, 25 pages.
Notice of Reasons for Rejection in Japanese Application No. 2022045315 mailed on Mar. 6, 2023, 16 pages.
The Office Action in Brazilian Application No. BR112020021895-2 mailed on Jan. 31, 2024, 7 pages.

* cited by examiner

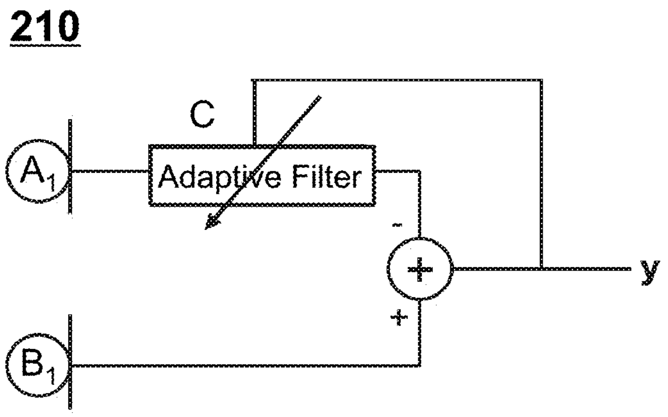
FIG. 2-A
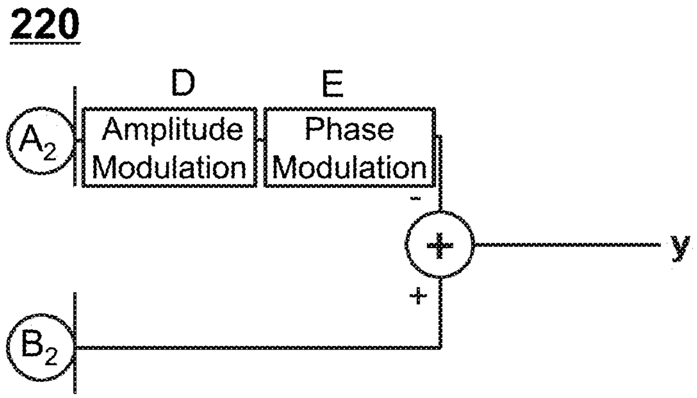
FIG. 2-B
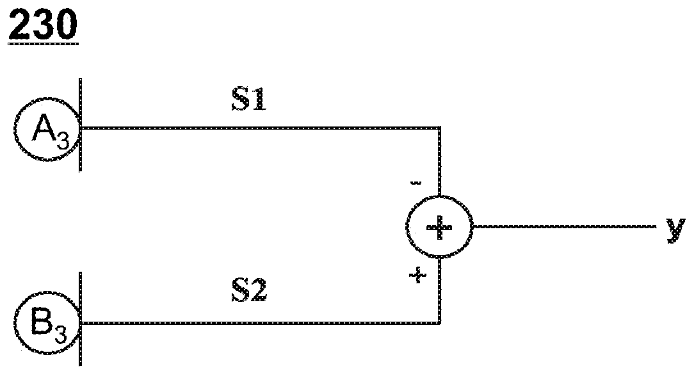
FIG. 2-C

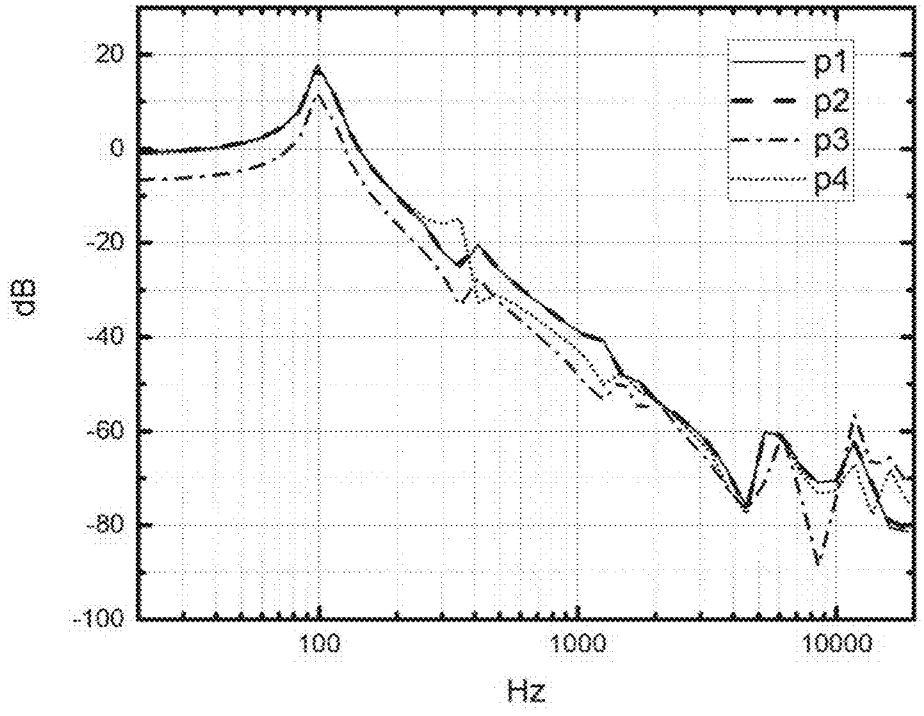
FIG. 4-A
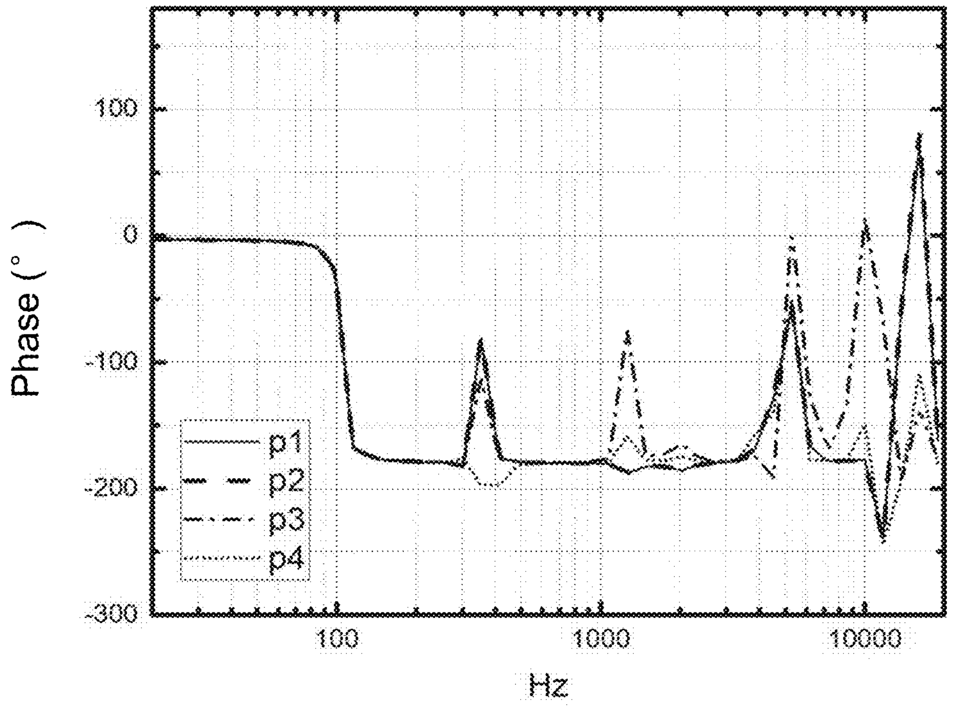
FIG. 4-B

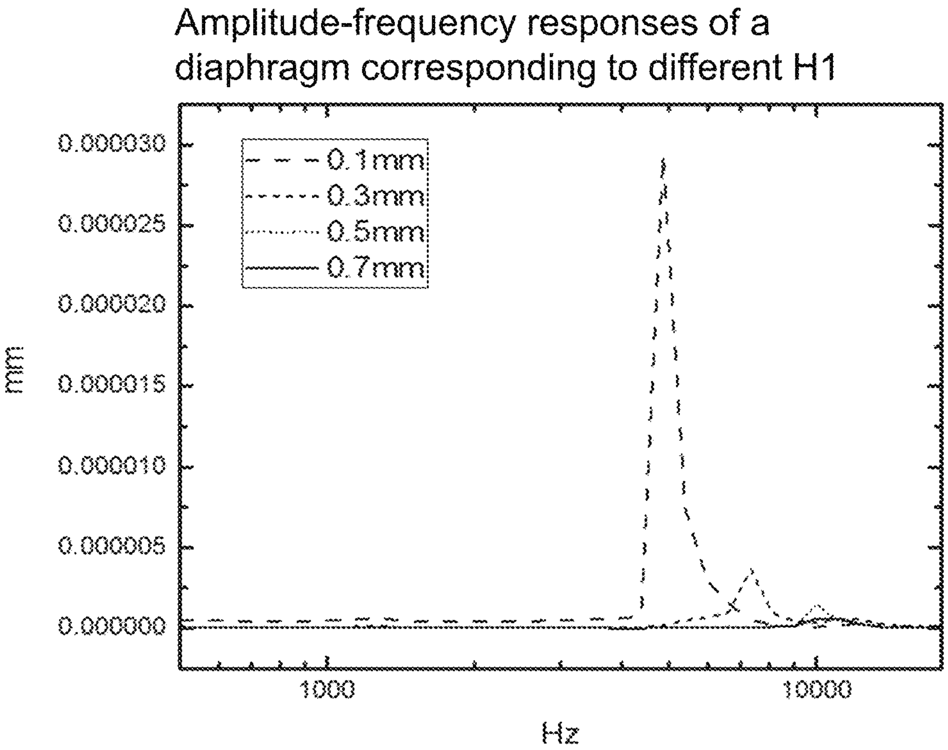
FIG. 6-A
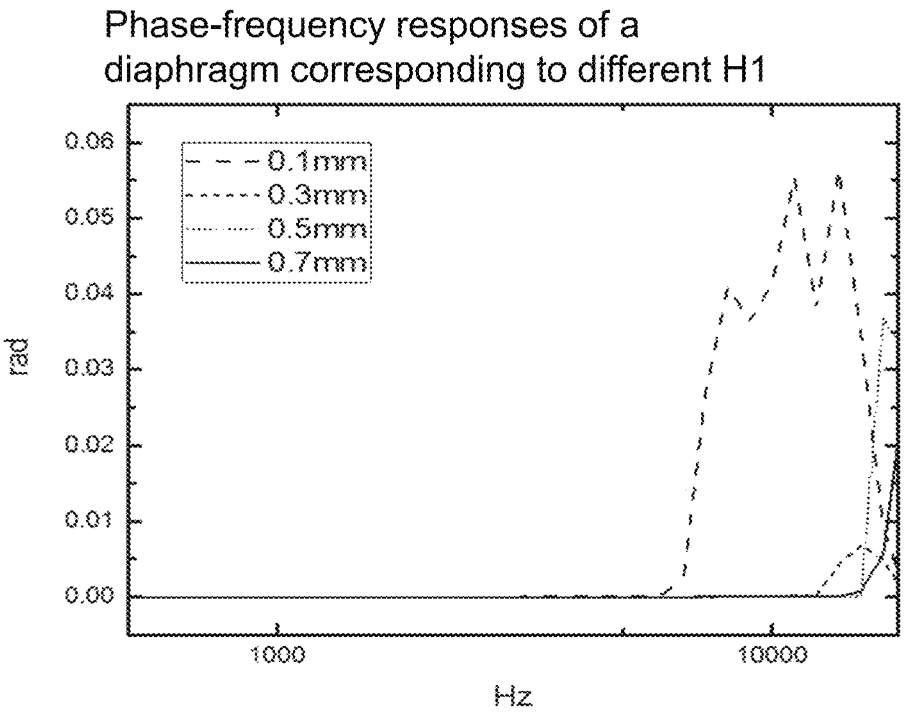
FIG. 6-B

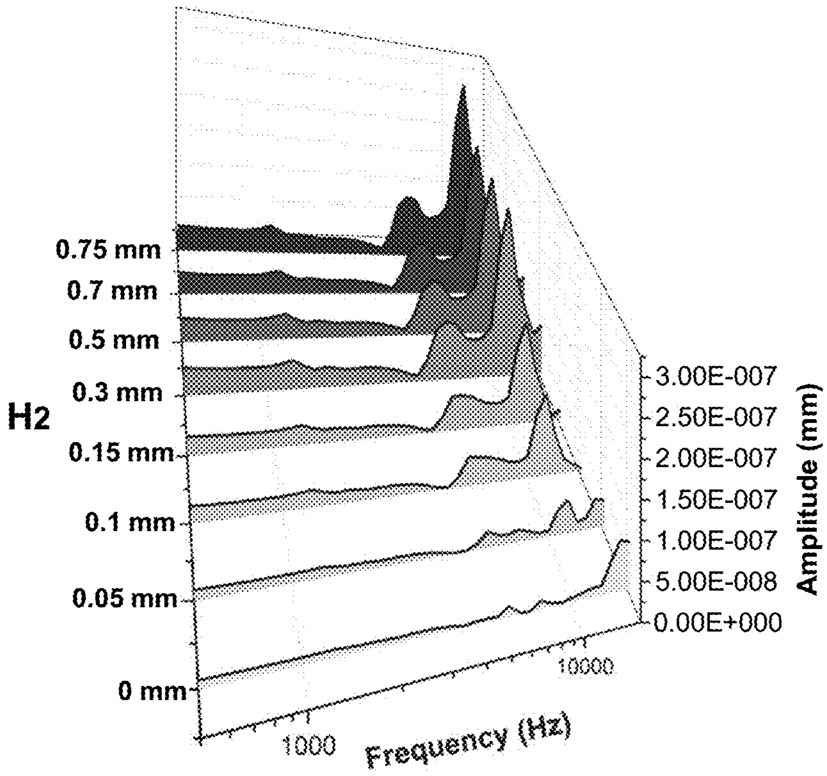
FIG. 8-A
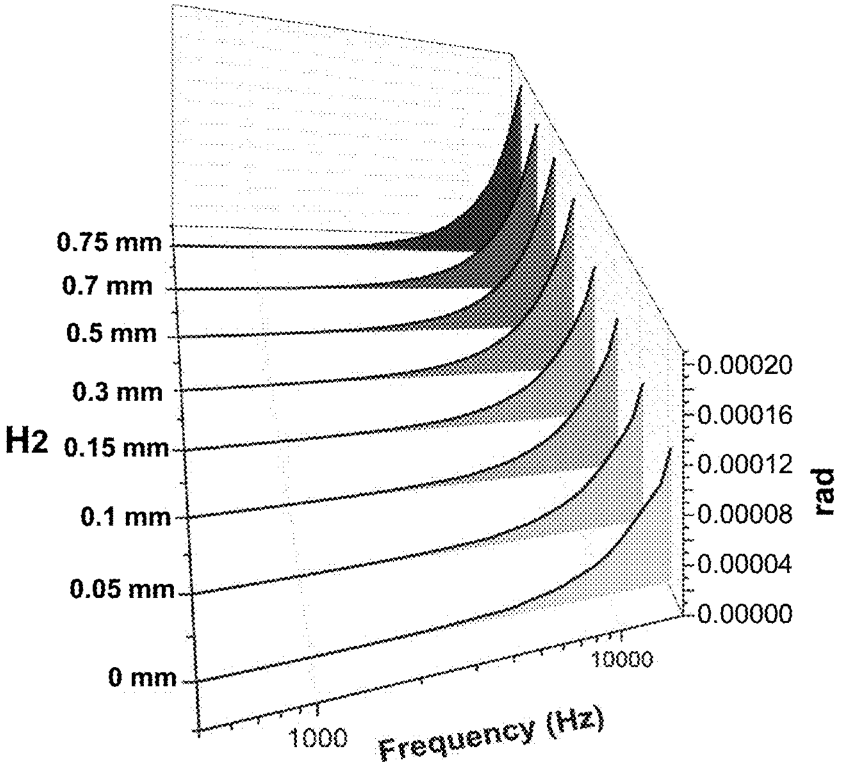
FIG. 8-B

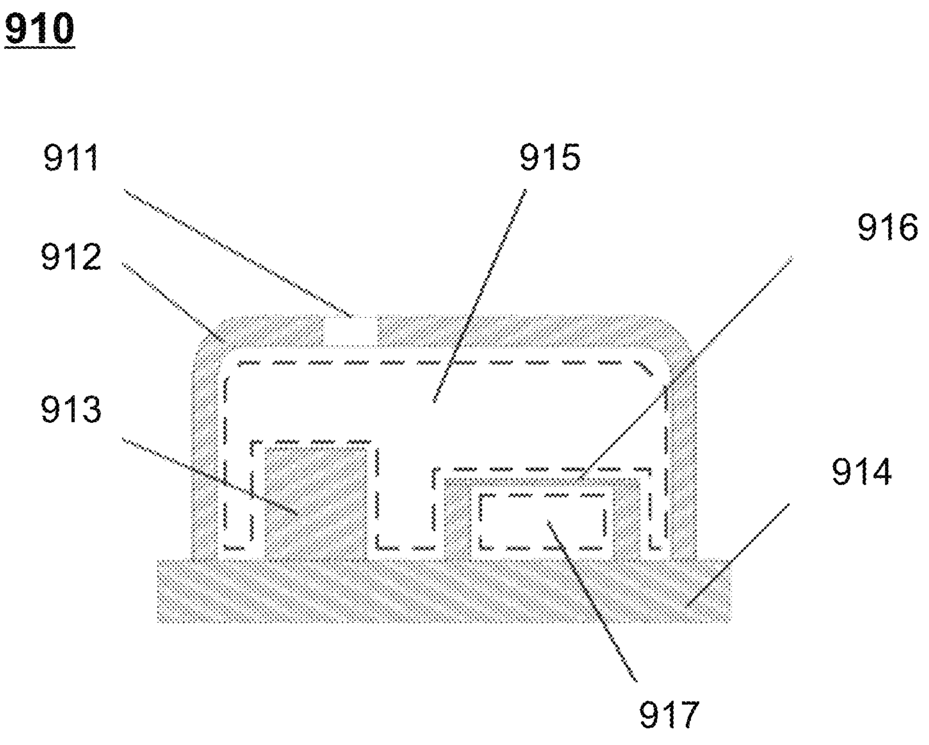
FIG. 9-A
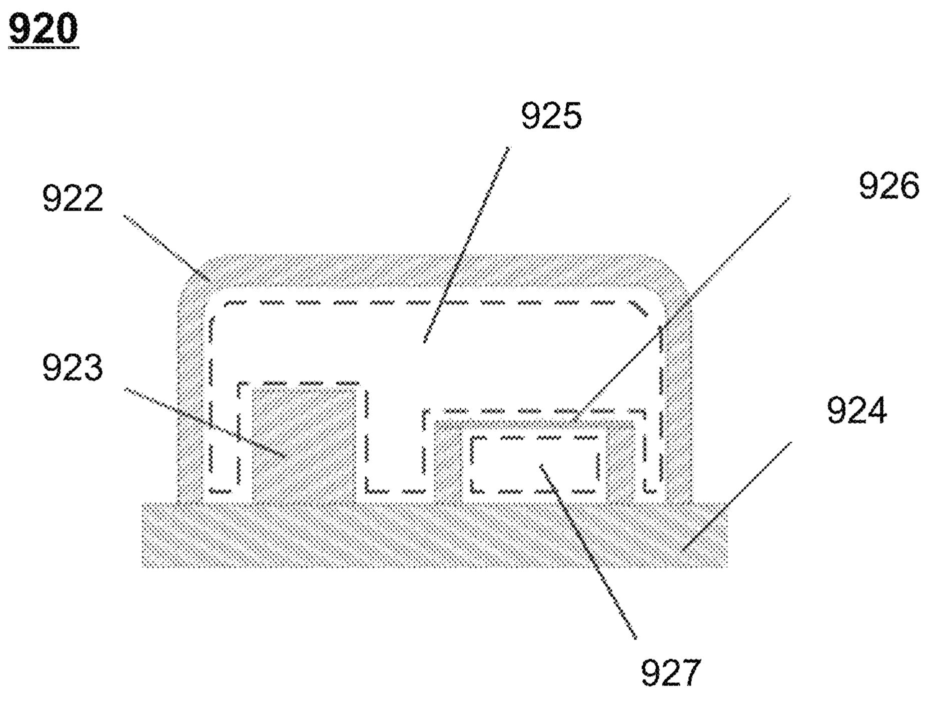
FIG. 9-B

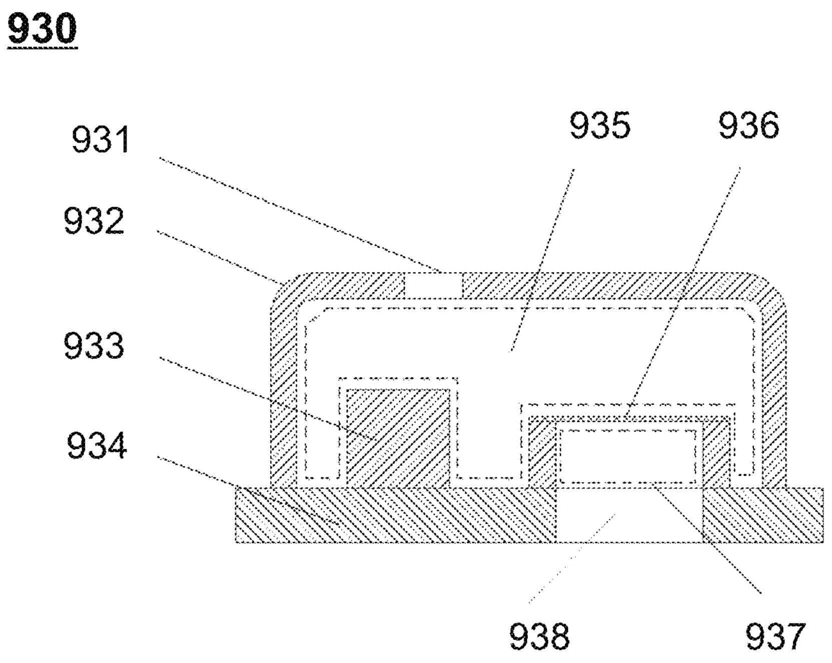
FIG. 9-C

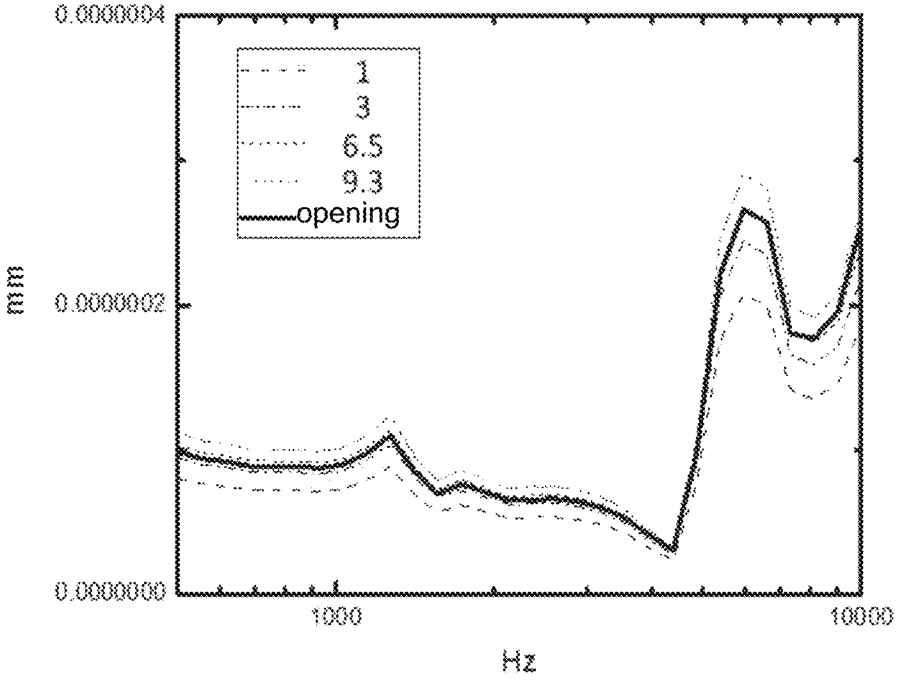
FIG. 10-A
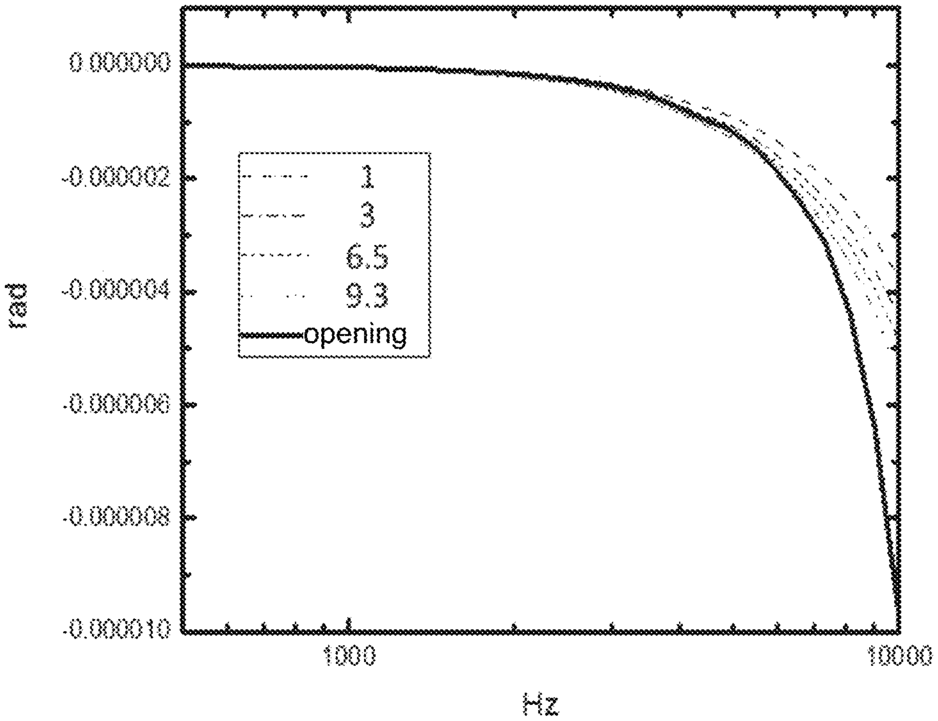
FIG. 10-B

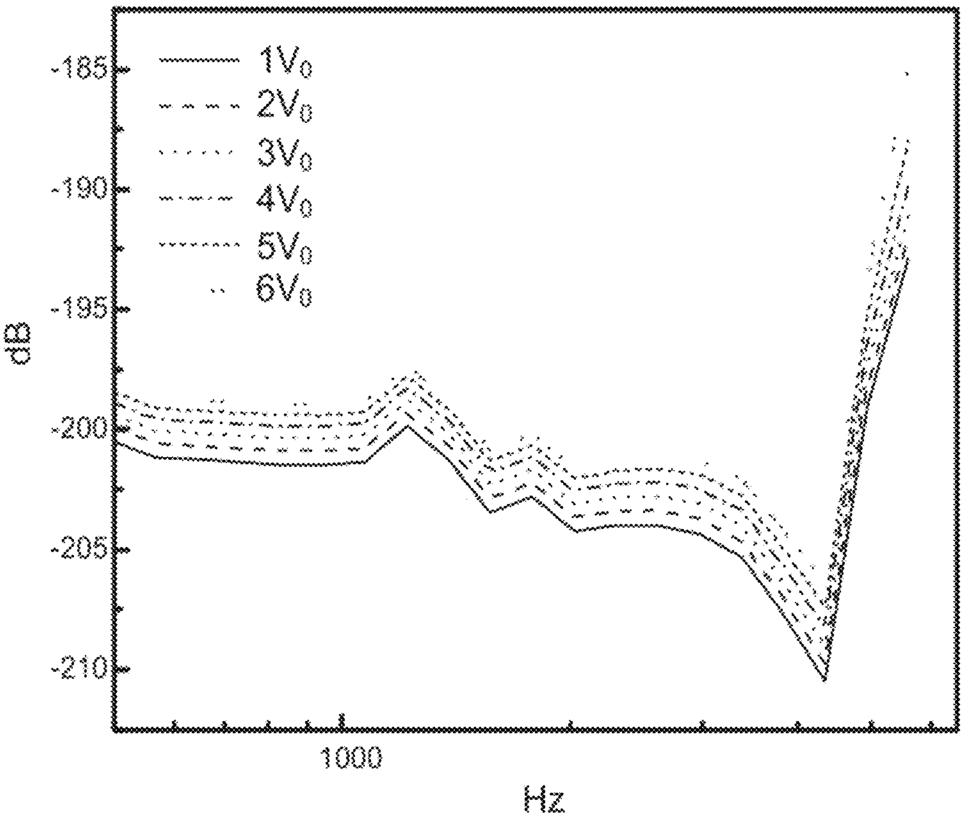
FIG. 11-A
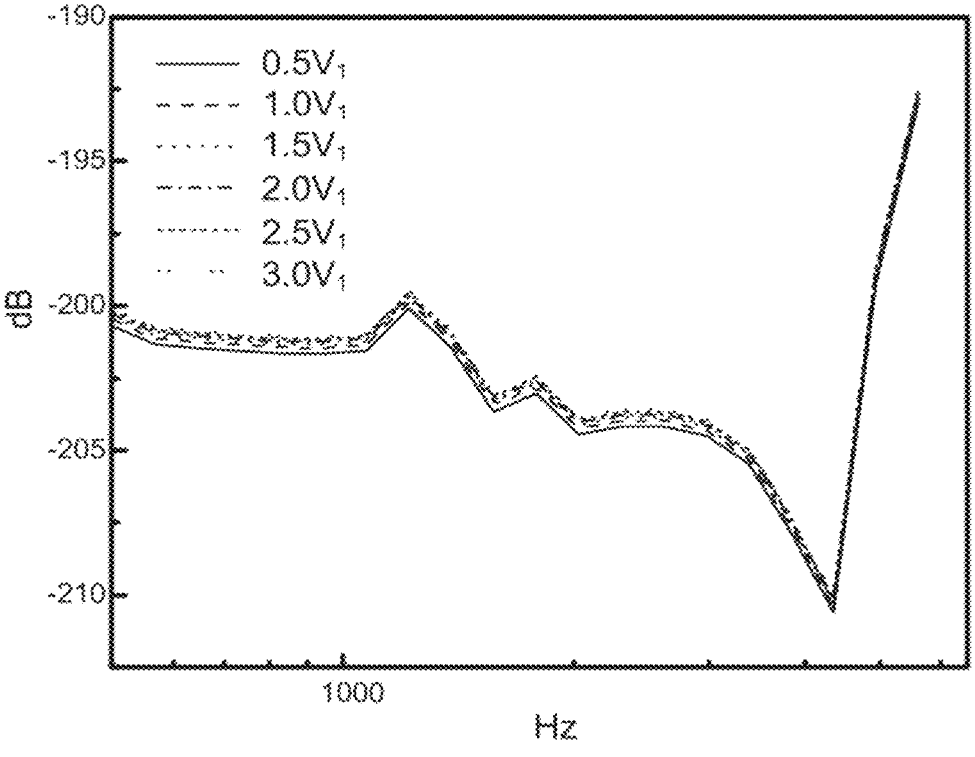
FIG. 11-B

VIBRATION REMOVAL APPARATUS AND METHOD FOR DUAL-MICROPHONE EARPHONES

CROSS-REFERENCE TO RELATED APPLICATION

This application is a continuation of U.S. application Ser. No. 17/079,438, filed on Oct. 24, 2020, which is a continuation of International Application No. PCT/CN2018/084588, filed on Apr. 26, 2018, the contents of which are hereby incorporated by reference in its entirety.

TECHNICAL FIELD

The present disclosure relates to a noise removal apparatus and method for earphones, and in particular to an apparatus and method for removing vibration noise in earphones by using dual-microphones.

BACKGROUND

A bone conduction earphone may allow the wearer to hear surrounding sounds with open ears, which becomes more and more popular in the market. As the usage scenario becomes complex, requirements for a communication effect in communication are getting higher and higher. During a call, vibration of a housing of the bone conduction earphone may be picked up by the microphone, which may generate echo or other interference during the call. In some earphones integrated with Bluetooth chips, a plurality of signal processing methods may be integrated on the Bluetooth chip, such as wind noise resistance, an echo cancellation, a dual-microphone noise removal, etc. However, compared with ordinary air conduction Bluetooth earphone, the signals received by the bone conduction earphone are more complex, which makes it more difficult to remove noise using signal processing methods, and there may be a serious loss of characters, serious reverberation, popping sounds, etc., thereby seriously affecting the communication effect. In some cases, in order to ensure the communication effect, it is necessary to provide a vibration removal structure in the earphone. However, due to the limitation of the volume of the earphone, a volume of the vibration removal structure may be also limited.

SUMMARY

According to one aspect of the present disclosure, a microphone apparatus is provided. The microphone apparatus may include a microphone and a vibration sensor. The microphone may be configured to receive a first signal including a voice signal and a first vibration signal. The vibration sensor may be configured to receive a second vibration signal. And the microphone and the vibration sensor are configured such that the first vibration signal can be offset with the second vibration signal.

In some embodiments, a cavity volume of the vibration sensor may be configured such that an amplitude-frequency response of the vibration sensor to the second vibration signal is the same as an amplitude-frequency response of the microphone to the first vibration signal, and/or a phase-frequency response of the vibration sensor to the second vibration signal is the same as a phase-frequency response of the microphone to the first vibration signal.

In some embodiments, the cavity volume of the vibration sensor may be proportional to a cavity volume of the microphone to make the second vibration signal offset the first vibration signal.

In some embodiments, a ratio of the cavity volume of the vibration sensor to the cavity volume of the microphone may be in a range of 3:1 to 6.5:1.

In some embodiments, the apparatus may further include a signal processing unit configured to make the first vibration signal offset with the second vibration signal and output the voice signal.

In some embodiments, the vibration sensor may be a closed microphone or a dual-link microphone.

In some embodiments, the microphone may be a front cavity opening earphone or a back cavity opening earphone, and the vibration sensor may be a closed microphone with a closed front cavity and a closed back cavity.

In some embodiments, the microphone may be a front cavity opening earphone or a back cavity opening earphone, and the vibration sensor may be a dual-link microphone with an open front cavity and an open back cavity.

In some embodiments, the front cavity opening of the microphone may include at least one opening on a top or a side wall of the front cavity.

In some embodiments, the microphone and the vibration sensor may be independently connected to a same housing.

In some embodiments, the apparatus may further include a vibration unit. At least one portion of the vibration unit may be located in the housing. And the vibration unit may be configured to generate the first vibration signal and the second vibration signal. The microphone and the vibration sensor may be located at adjacent positions on the housing or at symmetrical positions on the housing with respect to the vibration unit.

In some embodiments, a connection between the microphone or the vibration sensor and the housing may include one of a cantilever connection, a peripheral connection, or a substrate connection.

In some embodiments, the microphone and the vibration sensor may be both micro-electromechanical system microphones.

According to another aspect of the present disclosure, an earphone system is provided. The earphone system may include a vibration speaker, a microphone apparatus, and a housing. The vibration speaker and the microphone apparatus may be located in the housing, and the microphone apparatus may include a microphone and a vibration sensor. The microphone may be configured to receive a first signal including a voice signal and a first vibration signal. The vibration sensor may be configured to receive a second vibration signal, and the first vibration signal and the second vibration signal may be generated by vibration of the vibration speaker. And the microphone and the vibration sensor may be configured such that the first vibration signal can be offset with the second vibration signal.

Compared with the prior art, the beneficial effects of the present disclosure may include:

1. Using a combination of structural design and algorithms to more effectively remove vibration noise in the earphone;
2. Using specially designed vibration sensors (e.g., a bone conduction microphone, a closed microphone, or a dual-link microphone) to effectively shield air-conducted sound signals in the earphones such that only vibration and noise signals are picked up;
3. Using a structural design to make an amplitude-frequency response and/or a phase-frequency response of the vibration sensor (e.g., a bone conduction microphone, a closed microphone, or a dual-link microphone) to the vibration noise signal consistent with the air conduction microphone, thereby achieving a better noise removal effect.

BRIEF DESCRIPTION OF THE DRAWINGS

In order to illustrate the technical solutions related to the embodiments of the present disclosure, the drawings used to describe the embodiments are briefly introduced below. Obviously, drawings described below are only some examples or embodiments of the present disclosure. Those skilled in the art, without further creative efforts, may apply the present disclosure to other similar scenarios according to these drawings. Unless obviously obtained from the context or the context illustrates otherwise, the same numeral in the drawings refers to the same structure or operation.

FIGS. 2-A to 2-C are schematic diagrams illustrating signal processing methods for removing vibration noises according to some embodiments of the present disclosure;

FIG. 4-A is a schematic diagram illustrating amplitude-frequency response curves of a microphone disposed at different positions of a housing of an earphone according to some embodiments of the present disclosure;

FIG. 4-B is a schematic diagram illustrating phase-frequency response curves of a microphone disposed at different positions of a housing of an earphone according to some embodiments of the present disclosure;

FIG. 6-A is a schematic diagram illustrating amplitude-frequency response curves of a microphone or a vibration sensor connected to different positions on a housing according to some embodiments of the present disclosure;

FIG. 6-B is a schematic diagram illustrating phase-frequency response curves of a microphone or a vibration sensor connected to different positions on a housing according to some embodiments of the present disclosure;

FIG. 8-A is a schematic diagram illustrating amplitude-frequency response curves of a microphone or a vibration sensor connected to different positions on a housing according to some embodiments of the present disclosure;

FIG. 8-B is a schematic diagram illustrating phase-frequency response curves of a microphone or a vibration sensor connected to different positions on a housing according to some embodiments of the present disclosure;

FIGS. 9-A to 9-C are schematic diagrams illustrating a structure of a microphone and a vibration sensor according to some embodiments of the present disclosure;

FIG. 10-A is a schematic diagram illustrating amplitude-frequency response curves of a vibration sensor with different cavity heights according to some embodiments of the present disclosure;

FIG. 10-B is a schematic diagram illustrating phase-frequency response curves of a vibration sensor with different cavity heights according to some embodiments of the present disclosure;

FIG. 11-A is a schematic diagram illustrating amplitude-frequency response curves of an air conduction microphone when a front cavity volume changes according to some embodiments of the present disclosure;

FIG. 11-B is a schematic diagram illustrating amplitude-frequency response curves of an air conduction microphone when a back cavity volume changes according to some embodiments of the present disclosure;

FIG. 20 is a schematic diagram illustrating a structure of a dual-microphone earphone according to some embodiments of the present disclosure; and.

DETAILED DESCRIPTION

As shown in this specification and claims, unless the context clearly indicates exceptions, the words "a", "an", "an" and/or "the" do not specifically refer to the singular, but may also include the plural. The terms "including" and "including" only suggest that the steps and elements that have been clearly identified are included, and these steps and elements do not constitute an exclusive list, and the method or device may also include other steps or elements. The term "based on" is "based at least in part on". The term "one embodiment" means "at least one embodiment". The term "another embodiment" means "at least one additional embodiment." Related definitions of other terms will be given in the description below.

A flowchart is used in the present disclosure to illustrate the operations performed by the system according to the embodiments of the application. It should be understood that the preceding or following operations are not necessarily performed exactly in order. Instead, the various steps may be processed in reverse order or simultaneously. At the same time, one may also add other operations to these processes, or remove a step or several operations from these processes.

Figure 1:
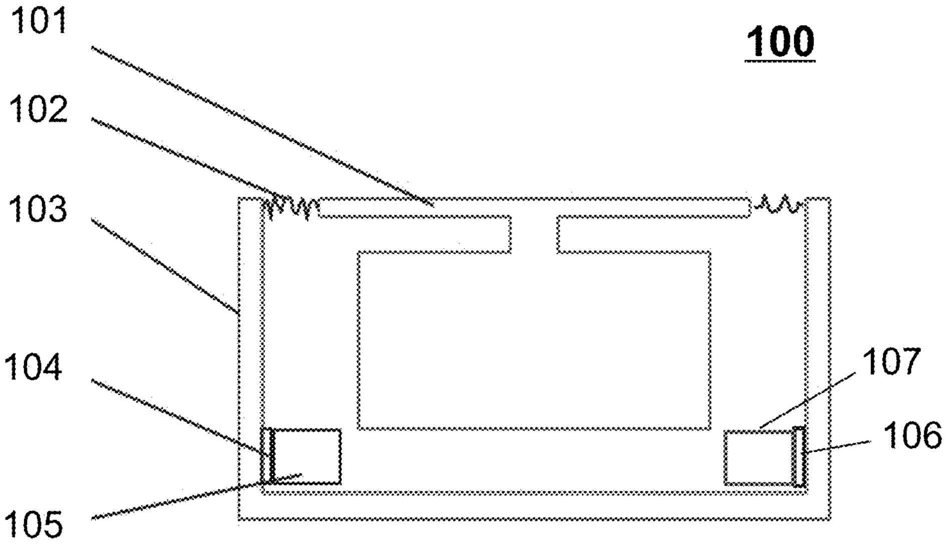
FIG. 1 is a schematic diagram illustrating a structure of a dual-microphone earphone according to some embodiments of the present disclosure.

FIG. 1 is a schematic diagram illustrating a structure of an earphone 100 according to some embodiments of the present disclosure. The earphone 100 may include a vibration speaker 101, an elastic structure 102, a housing 103, a first connecting structure 104, a microphone 105, a second connecting structure 106, and a vibration sensor 107.

The vibration speaker 101 may convert electrical signals into sound signals. The sound signals may be transmitted to a user through air conduction or bone conduction. For example, the speaker 101 may contact the user's head directly or through a specific medium (e.g., one or more panels), and transmit the sound signal to the user's auditory nerve in the form of skull vibration.

The housing 101 may be used to support and protect one or more components in the earphone 100 (e.g., the speaker 101). The elastic structure 102 may connect the vibration speaker 101 and the housing 103. In some embodiments, the elastic structure 102 may fix the vibration speaker 101 in the housing 103 in a form of a metal sheet, and reduce vibration transmitted from the vibration speaker 101 to the housing 103 in a vibration damping manner.

The microphone 105 may collect sound signals in the environment (e.g., the user's voice), and convert the sound signals into electrical signals. In some embodiments, the microphone 105 may acquire sound transmitted through the air (also referred to as "air conduction microphone").

The vibration sensor 107 may collect mechanical vibration signals (e.g., signals generated by vibration of the housing 103), and convert the mechanical vibration signals into electrical signals. In some embodiments, the vibration sensor 107 may be an apparatus that is sensitive to mechanical vibration and insensitive to air-conducted sound (that is, the responsiveness of the vibration sensor 107 to mechanical vibration exceeds the responsiveness of the vibration sensor 107 to air-conducted sound). The mechanical vibration signal used herein mainly refers to vibration propagated through solids. In some embodiments, the vibration sensor 107 may be a bone conduction microphone. In some embodiments, the vibration sensor 107 may be obtained by changing a configuration of the air conduction microphone. Details regarding changing the air conduction microphone to obtain the vibration sensor may be found in other parts, of the present disclosure, for example, FIGS. 9-B and 9-C, and the descriptions thereof.

The microphone 105 may be connected to the housing 103 through the first connection structure 104. The vibration sensor 107 may be connected to the housing 103 through the second connection structure 106. The first connection structure 104 and/or the second connection structure 106 may connect the microphone 105 and the vibration sensor 107 to the inner side of the housing 103 in the same or different manner. Details regarding the first connection structure 104 and/or the second connection structure 106 may be found in other parts of the present disclosure, for example, FIG. 5 and/or FIG. 7, and the descriptions thereof.

Due to the influence of other components in the earphone 100, the microphone 105 may generate noises during operation. For illustration purposes only, a noise generation process of the microphone 105 may be described as follows. The vibration speaker 101 may vibrate when an electric signal is applied. The vibration speaker 101 may transmit the vibration to the housing 103 through the elastic structure 102. Since the housing 103 and the microphone 105 are directly connected through the connection structure 104, the vibration of the housing 103 may cause the vibration of a diaphragm in the microphone 105. In such cases, noises (also referred to as "vibration noise" or "mechanical vibration noise") may be generated.

The vibration signal obtained by the vibration sensor 107 may be used to eliminate the vibration noise generated in the microphone 105. In some embodiments, a type of the microphone 105 and/or the vibration sensor 107, a position where the microphone 105 and/or the vibration sensor 107 is connected to the inner side of the housing 103, a connection manner between the microphone 105 and/or the vibration sensor 107 and the housing 103 may be selected such that an amplitude-frequency response and/or a phase-frequency response of the microphone 105 to vibration may be consistent with that of the vibration sensor 107, thereby eliminating the vibration noise generated in the microphone 105 using the vibration signal collected by the vibration sensor 107.

The above description of the structure of the earphone is only a specific example and should not be regarded as the only feasible implementation. Obviously, for those skilled in the art, after understanding the basic principles of earphones, it may be possible to make various modifications and changes in the form and details of the specific methods of implementing earphones without departing from the principles. However, these modifications and changes are still within the scope described above. For example, the earphone 100 may include more microphones or vibration sensors to eliminate vibration noises generated by the microphone 105.

FIG. 2-A is a schematic diagram illustrating a signal processing method for removing vibration noises according to some embodiments of the present disclosure. In some embodiments, the signal processing method may include causing the vibration noise signal received by the microphone to be offset with the vibration signal received by the vibration sensor using a digital signal processing method. In some embodiments, the signal processing method may include directly causing the vibration noise signal received by the microphone and the vibration signal received by the vibration sensor to offset each other using an analog signal generated by an analog circuit. In some embodiments, the signal processing method may be implemented by a signal processing unit in the earphone.

As shown in FIG. 2-A, in the signal processing circuit 210, $A_1$ is a vibration sensor (e.g., the vibration sensor 107), $B_1$ is a microphone (e.g., the microphone 105). The vibration sensor $A_1$ may receive a vibration signal, the microphone $B_1$ may receive an air-conducted sound signal and a vibration noise signal. The vibration signal received by the vibration sensor $A_1$ and the vibration noise signal received by the microphone $B_1$ may originate from a same vibration source (e.g., the vibration speaker 101). The vibration signal received by the vibration sensor $A_1$, after passing through an adaptive filter C, may be superimposed with the vibration noise signal received by the microphone $B_1$. The adaptive filter C may adjust the vibration signal received by the vibration sensor $A_1$ according to the superposition result (e.g., adjust amplitude and/or phase of the vibration signal) so as to cause the vibration signal received by the vibration sensor $A_1$ to offset the vibration noise signal received by the microphone $B_1$, thereby removing noises.

In some embodiments, parameters of the adaptive filter C may be fixed. For example, since a connection position and a connection manner between the vibration sensor A1 and the housing of the earphone, and between the microphone B1 and the housing of the earphone are fixed, an amplitude-frequency response and/or a phase-frequency response of the vibration sensor $A_1$ and the microphone $B_1$ to vibration may remain unchanged. Therefore, the parameters of the adaptive filter C may be stored in a signal processing chip after being determined, and may be directly used in the signal processing circuit 210. In some embodiments, the parameters of the adaptive filter C may be variable. In a noise removal process, the parameters of the adaptive filter C may be adjusted according to the signals received by the vibration sensor $A_1$ and/or the microphone $B_1$ to remove noises.

FIG. 2-B is a schematic diagram illustrating a signal processing method for removing vibration noises according to some embodiments of the present disclosure. A difference between FIG. 2-A and FIG. 2-B is that, instead of the adaptive filter C, a signal amplitude modulation component D and a signal phase modulation component E are used in the signal processing circuit 220 of FIG. 2-B. After amplitude and phase modulation, the vibration signal received by the vibration sensor $A_2$ may offset the vibration noise signal received by the microphone $B_2$, thereby removing noises. In some embodiments, the signal processing method may be implemented by a signal processing unit in the earphone. In some embodiments, the signal amplitude modulation element D or the signal phase modulation element E may be unnecessary.

FIG. 2-C is a schematic diagram illustrating a signal processing method for removing vibration noises according to some embodiments of the present disclosure. Different from the signal processing circuit in FIGS. 2-A and 2-B, in FIG. 2-C, due to a reasonable structural design, the vibration noise signal S2 obtained by the microphone $B_3$ may be directly subtracted with the vibration signal S1 received by the vibration sensor $A_3$, thereby removing noises. In some embodiments, the signal processing method may be implemented by a signal processing unit in the earphone.

It should be noted that in the process of processing the two signals in FIG. 2-A, 2-B or 2-C, a superposition process of the signal received by the vibration sensor and the signal received by the microphone may be understood as a process in which a part related to the vibration noise in the signal received by the microphone may be removed based on the signal received by the vibration sensor, thereby removing the vibration noise.

The above description of noise removal is only a specific example and should not be regarded as the only feasible implementation. Obviously, for those skilled in the art, after understanding the basic principles of earphones, it may be possible to make various modifications and changes in the form and details of the specific methods of implementing noise removal without departing from this principle. However, these modifications and changes are still within the scope described above. For example, for those skilled in the art, the adaptive filter C, the signal amplitude modulation component D, and the signal phase modulation component E may be replaced by other components or circuits that may be used for signal conditioning, as long as the replacement components or circuits can achieve the purpose of adjusting the vibration signal of the vibration sensor to remove the vibration noise signal in the microphone.

Figure 3:
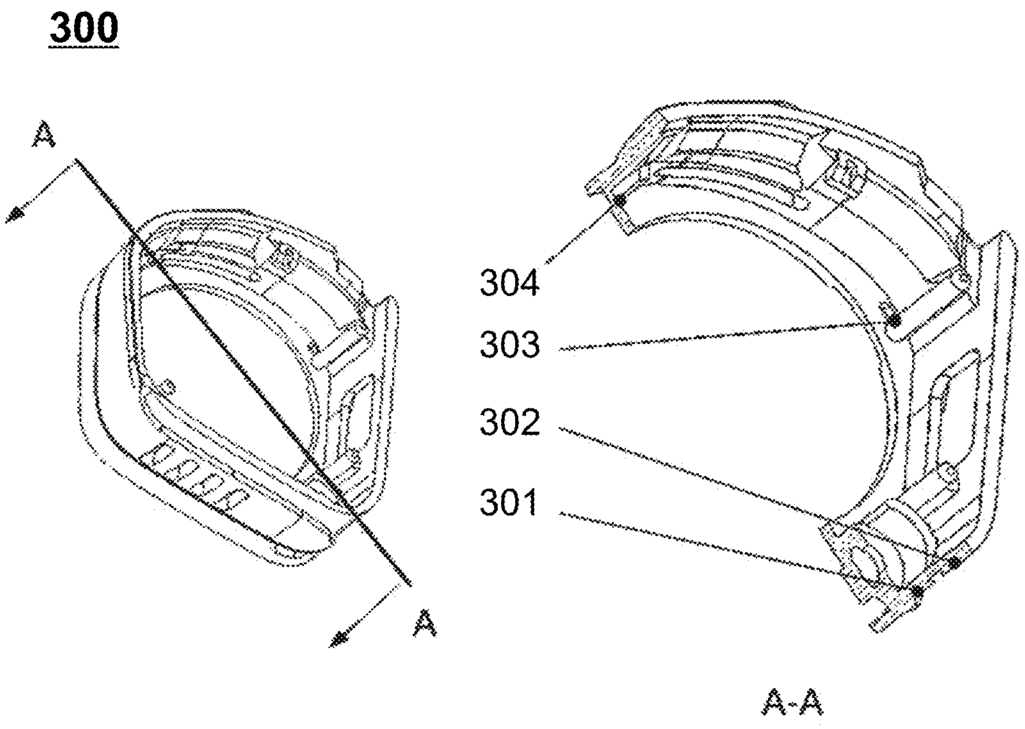
FIG. 3 is a schematic diagram illustrating a structure of a housing of an earphone according to some embodiments of the present disclosure.

As mentioned above, the amplitude-frequency response and/or phase-frequency response of the vibration sensor and/or the microphone to vibration may be related to a position on which it is located on the housing of the earphone. By adjusting the position of the vibration sensor and/or the microphone connected to the housing, the amplitude-frequency response and/or phase-frequency response of the microphone to vibration may be basically consistent with that of the vibration sensor, such that the vibration signal collected by the vibration sensor may be used to offset the vibration noise generated by the microphone. FIG. 3 is a schematic diagram illustrating a structure of a housing of an earphone according to some embodiments of the present disclosure. As shown in FIG. 3, the housing 300 may be annular. The housing 300 may support and protect the vibration speaker (e.g., the vibration speaker 101) in the earphone. Position 301, position 302, position 303, and position 304 are four optional positions in the housing 300 where a microphone or a vibration sensor may be placed. When the microphone and the vibration sensor are connected to different positions in the housing 300, the amplitude-frequency response and/or phase-frequency response of the microphone and the vibration sensor to vibration may also be different. Among the positions, position 301 and position 302 are adjacent. Position 303 and position 301 are located at adjacent corners of the housing 300. Position 304 is the farthest from position 301 and is located at a diagonal position of the housing 300.

FIG. 4-A is a schematic diagram illustrating amplitude-frequency response curves of a microphone disposed at different positions of a housing of an earphone according to some embodiments of the present disclosure. FIG. 4-B is a schematic diagram illustrating phase-frequency response curves of a microphone disposed at different positions of a housing of an earphone according to some embodiments of the present disclosure. As shown in FIG. 4-A, the horizontal axis denotes the vibration frequency, and the vertical axis denotes the amplitude-frequency response of the microphone to vibration. The vibration may be generated by the vibration speaker in the earphone and may be transmitted to the microphone through the housing, a connection structure, or the like. The curves P1, P2, P3, and P4 may denote the amplitude-frequency response curves when the microphone is disposed at position 301, position 302, position 303, and position 304 in the housing 300, respectively. As shown in FIG. 4-B, the horizontal axis is the vibration frequency, and the vertical axis is the phase-frequency response of the microphone to vibration. The curves P1, P2, P3, and P4 may denote the phase-frequency response curves when the microphone is located at position 301, position 302, position 303, and position 304 in the housing, respectively.

Taking position 301 as a reference, it may be seen that the amplitude-frequency response curve and phase-frequency response curve when the microphone is at position 302 may be most similar to the amplitude-frequency response curve and phase-frequency response curve when the microphone is at position 301. Secondly, the amplitude-frequency response curve and phase-frequency response curve when the microphone is located at the position 304 may be relatively similar to the amplitude-frequency response curve and the phase-frequency response curve when the microphone is located at the position 301. In some embodiments, without considering other factors such as a structure and a connection of the microphone and the vibration sensor, the microphone and the vibration sensor may be connected at close positions (e.g., adjacent positions) inside the housing, or at symmetrical positions (e.g., when the vibration speaker is located in the center of the housing, the microphone and the vibration sensor may be located at diagonal positions of the housing, respectively) relative to the vibration speaker inside the housing. In such cases, a difference between the amplitude-frequency response and/or phase-frequency response of the microphone and that of the vibration sensor may be minimized, thereby more effectively removing the vibration noise in the microphone.

Figure 5:
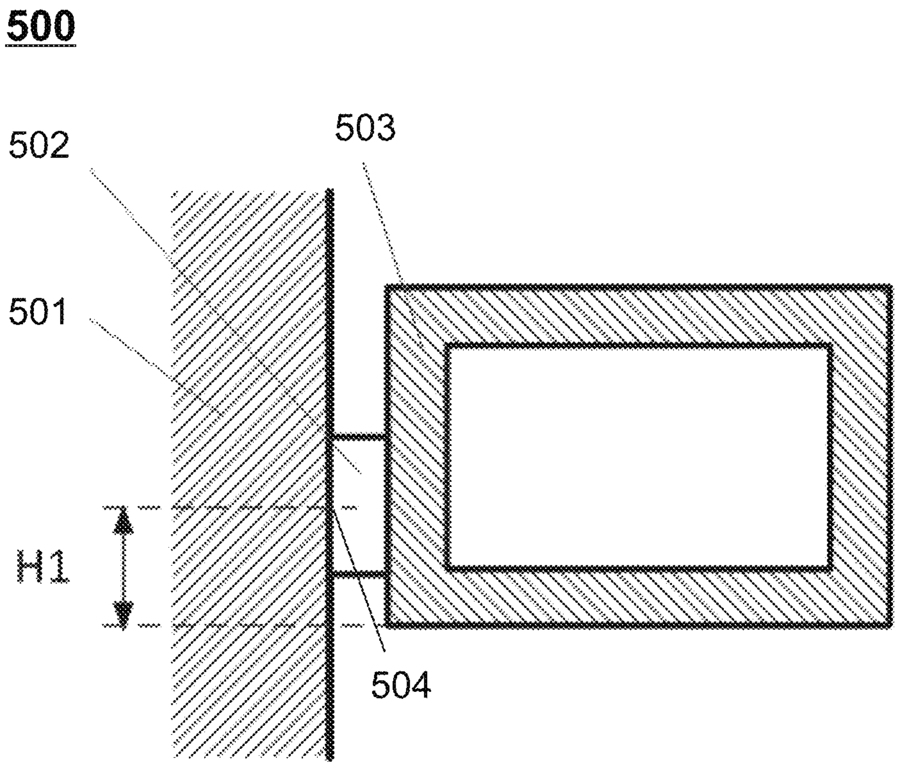
FIG. 5 is a schematic diagram illustrating a microphone or a vibration sensor connected to a housing according to some embodiments of the present disclosure.

FIG. 5 is a schematic diagram illustrating a microphone or a vibration sensor connected to a housing according to some embodiments of the present disclosure. For the purpose of illustration, the connection between the microphone and the housing may be described below as an example.

As shown in FIG. 5, a side wall of the microphone 503 may be connected to a side wall 501 of the earphone housing through a connection structure 502 and form a cantilever connection. The connection structure 502 may fix the microphone 503 and the side wall 501 of the housing in an interference manner with a silicone sleeve, or directly connect the microphone 503 and the side wall 501 of the housing with glue (hard glue or soft glue). As shown in the figure, a contact point 504 between a central axis of the connection structure 502 and the side wall 501 of the housing may be defined as a dispensing position. A distance between the dispensing position 504 and a bottom of the microphone 503 may be H1. The amplitude-frequency response and/or phase-frequency response of the microphone 503 to vibration may vary with the change of the dispensing position.

FIG. 6-A is a schematic diagram illustrating amplitude-frequency response curves of a microphone connected to different positions on a housing according to some embodiments of the present disclosure. As shown in FIG. 6-A, the horizontal axis denotes the vibration frequency, and the vertical axis denotes the amplitude-frequency response of the microphone to vibrations of different frequencies. The vibration may be generated by the vibration speaker in the earphone and may be transmitted to the microphone through the housing, the connection structure, or the like. As shown in the figure, when the distance H1 between the dispensing position and the bottom of the microphone is 0.1 mm, a peak value of the amplitude-frequency response of the microphone is the highest. When H1 is 0.3 mm, the peak value of the amplitude-frequency response may be lower than the peak value when H1 is 0.1 mm, and may move to high frequencies. When H1 is 0.5 mm, the peak value of the amplitude-frequency response may further drop and move to high frequencies. When H1 is 0.7 mm, the peak value of the amplitude-frequency response may further drop and move to the high frequencies. At this time, the peak value may almost drop to zero. It may be seen that the amplitude-frequency response of the microphone to vibration may change with the change of the dispensing position. In practical applications, the dispensing position may be flexibly selected according to actual requirements so as to obtain a microphone with a required amplitude-frequency response to vibration.

FIG. 6-B is a schematic diagram illustrating phase-frequency response curves of a microphone connected to different positions on a housing according to some embodiments of the present disclosure. As shown in FIG. 6-B, the horizontal axis denotes the vibration frequency, and the vertical axis denotes the phase-frequency response of the microphone to vibrations of different frequencies. It may be seen from FIG. 6-B that as the distance between the dispensing position and the bottom of the microphone increases, a vibration phase of the diaphragm of the microphone may change accordingly, and the position of the phase mutation may move to high frequencies. It may be seen that the phase-frequency response of the microphone to vibration may change with the change of the dispensing position. In practical applications, the dispensing position may be flexibly selected according to actual requirements to obtain a microphone with a required phase-frequency response to vibration.

Obviously, for those skilled in the art, in addition to the manner that the microphone is connected to the side wall of the housing, the microphone may also be connected to the housing in other manners or other positions. For example, the bottom of the microphone may be connected to the bottom of the inside of the housing (also referred to as "substrate connection").

Figure 7:
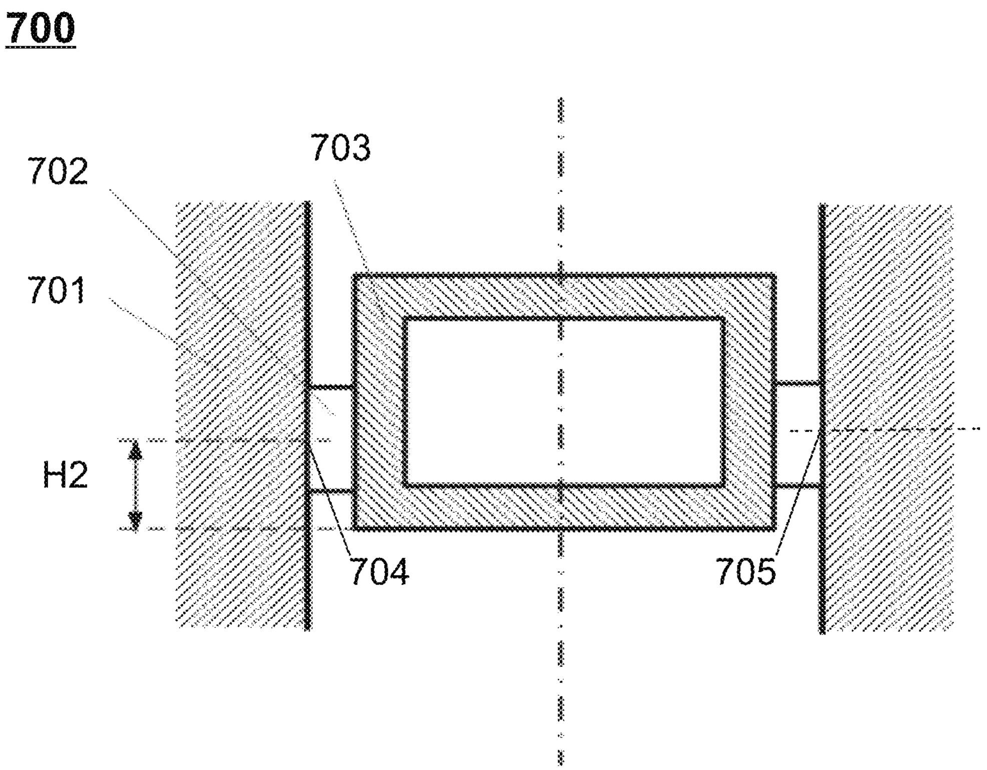
FIG. 7 is a schematic diagram illustrating a microphone or a vibration sensor connected to a housing according to some embodiments of the present disclosure.

In addition, the microphone may also be connected to the housing through a peripheral connection. For example, FIG. 7 is a schematic diagram illustrating a microphone connected to a housing through a peripheral connection according to some embodiments of the present disclosure. As shown in FIG. 7, at least two side walls of a microphone 703 may be respectively connected to a housing 701 through a connection structure 702 and form a peripheral connection. The connection structure 702 may be similar to the connection structure 502, which is not repeated here. As shown in the figure, contact points 704 and 705 between a central axis of the connection structure 702 and the housing may be dispensing positions, and a distance between the dispensing position and the bottom of the microphone 703 may be H2. An amplitude-frequency response and/or phase-frequency response of the microphone 703 to vibration may vary with the change of the dispensing position H2.

FIG. 8-A is a schematic diagram illustrating amplitude-frequency response curves of a microphone connected to different positions on a housing through a peripheral connection according to some embodiments of the present disclosure. As shown in FIG. 8-A, the horizontal axis denotes the vibration frequency, and the vertical axis denotes the amplitude-frequency response of the microphone to vibrations of different frequencies. It may be seen from FIG. 8-A that as the distance between the dispensing position and the bottom of the microphone increases, the peak value of the amplitude-frequency response of the microphone may gradually increase. It may be seen that when the microphone is connected to the housing through a peripheral connection, the amplitude-frequency response of the microphone to vibration may change with the change of the dispensing position. In practical applications, the dispensing position may be flexibly selected according to actual requirements to obtain a microphone with a required amplitude-frequency response to vibration.

FIG. 8-B is a schematic diagram illustrating phase-frequency response curves of a microphone connected to different positions on a housing through a peripheral connection according to some embodiments of the present disclosure. As shown in FIG. 8-B, the horizontal axis denotes the vibration frequency, and the vertical axis denotes the phase-frequency response of the microphone to vibrations of different frequencies. It may be seen from FIG. 8-B that as the distance between the dispensing position and the bottom of the microphone increases, the vibration phase of the diaphragm of the microphone may also change, and the position of the phase mutation may move to high frequencies. It may be seen that when the microphone is connected to the housing through a peripheral connection, the phase-frequency response of the microphone to vibration may vary with the change of the dispensing position. In practical applications, the dispensing position may be flexibly selected according to actual requirements to obtain a microphone with a required phase-frequency response to vibration.

In some embodiments, in order to make the amplitude-frequency response/phase-frequency response of the vibration sensor to the vibration as consistent as possible with that of the microphone, the vibration sensor and the microphone may be connected in the housing in the same manner (e.g., one of a cantilever connection, a peripheral connection, or a substrate connection), and the respective dispensing positions of the vibration sensor and the microphone may be the same or as close as possible.

As described above, the amplitude-frequency response and/or phase-frequency response of the vibration sensor and/or the microphone to vibration may be related to the type of the microphone and/or the vibration sensor. By selecting an appropriate type of microphone and/or vibration sensor, the amplitude-frequency response and/or phase-frequency response of the microphone and the vibration sensor to vibration may be basically the same, such that the vibration signal obtained by the vibration sensor may be used to remove the vibration noise picked by the microphone.

FIG. 9-A is a schematic diagram illustrating a structure of an air conduction microphone 910 according to some embodiments of the present disclosure. In some embodiments, the air conduction microphone 910 may be a microelectromechanical system (MEMS) microphone. MEMS microphones may have the characteristics of small size, low power consumption, high stability, and well consistency of amplitude-frequency and phase-frequency response. As shown in FIG. 9-A, the air conduction microphone 910 may include an opening 911, a housing 912, an integrated circuit (ASIC) 913, a printed circuit board (PCB) 914, a front cavity 915, a diaphragm 916, and a back cavity 917. The opening 911 may be located on one side of the housing 912 (an upper side in FIG. 9-A, that is, the top). The integrated circuit 913 may be mounted on the PCB 914. The front cavity 915 and the back cavity 917 may be separated and formed by the diaphragm 916. As shown in the figure, the front cavity 915 may include a space above the diaphragm 916 and may be formed by the diaphragm 916 and the housing 912. The back cavity 917 may include a space below the diaphragm 916 and may be formed by the diaphragm 916 and the PCB 914. In some embodiments, when the air conduction microphone 910 is placed in the earphone, air conduction sound in the environment (e.g., the user's voice) may enter the front cavity 915 through the opening 911 and cause vibration of the diaphragm 916. At the same time, the vibration signal generated by the vibration speaker may cause vibration of the housing 912 of the air conduction microphone 910 through the housing, a connection structure, etc. of the earphone, thereby driving the diaphragm 916 to vibrate, thereby generating a vibration noise signal.

In some embodiments, the air conduction microphone 910 may be replaced by a manner in which the back cavity 917 has an opening, and the front cavity 915 is isolated from outside air.

FIG. 9-B is a schematic diagram illustrating a structure of a vibration sensor 920 according to some embodiments of the present disclosure. As shown in FIG. 9-B, the vibration sensor 920 may include a housing 922, an integrated circuit (ASIC) 923, a printed circuit board (PCB) 924, a front cavity 925, a diaphragm 926, and a back cavity 927. In some embodiments, the vibration sensor 920 may be obtained by closing the opening 911 of the air conduction microphone in FIG. 9-A (in the present disclosure, the vibration sensor 920 may also be referred to as a closed microphone 920). In some embodiments, when the closed microphone 920 is placed in the earphone, air conduction sound in the environment (e.g., the user's voice) may not enter the closed microphone 920 to cause the diaphragm 926 to vibrate. The vibration generated by the vibration speaker may cause the housing 922 of the enclosed microphone 920 to vibrate through the housing, a connection structure, etc. of the earphone, and may further drive the diaphragm 926 to vibrate to generate a vibration signal.

FIG. 9-C is a schematic diagram illustrating a structure of a vibration sensor 930 according to some embodiments of the present disclosure. As shown in FIG. 9-C, the vibration sensor 930 may include an opening 931, a housing 932, an integrated circuit (ASIC) 933, a printed circuit board (PCB) 934, a front cavity 935, a diaphragm 936, a back cavity 937, and an opening 938. In some embodiments, the vibration sensor 930 may be obtained by punching a hole at a bottom of the back cavity 937 of the air conduction microphone in FIG. 9-A, such that the back cavity 937 may communicate with the outside (in the present disclosure, the vibration sensor 930 may also be referred to as a dual-link microphone 930). In some embodiments, when the dual-link microphone 930 is placed in the earphone, the air conduction sound in the environment (e.g., the user's voice) may enter the dual-link microphone 930 through the opening 931 and the opening 938, such that air-conducted sound signals received on both sides of the diaphragm 936 may offset each other. Therefore, the air-conducted sound signals may not cause obvious vibration of the diaphragm 936. The vibration generated by the vibration speaker may cause the housing 932 of the dual-communication microphone 930 to vibrate through the housing, a connection structure, etc. of the earphone, and may further drive the diaphragm 936 to vibrate to generate a vibration signal.

The above descriptions of the air conduction microphone and the vibration sensor are only specific examples, and should not be regarded as the only feasible implementation. Obviously, for those skilled in the art, after understanding the basic principle of the microphone, it may be possible to make various modifications and changes to the specific structure of the microphone and/or the vibration sensor without departing from the principles. However, these modifications and changes are still within the scope described above. For example, for those skilled in the art, the opening 911 or 931 in the air conduction microphone 910 or the vibration sensor 930 may be arranged on a left or right side of the housing 912 or the housing 932, as long as the opening may facilitate communication between the front cavity 915 or 935 with the outside. Further, a count of openings may be not limited to one, and the air conduction microphone 910 or the vibration sensor 930 may include a plurality of openings similar to the openings 911 or 931.

In some embodiments, the vibration signal generated by the diaphragm 926 or 936 of the closed microphone 920 or the dual-microphone 930 may be used to offset the vibration noise signal generated by the diaphragm 916 of the air conduction microphone 910. In some embodiments, in order to obtain a better effect of removing vibration and noise, it may be necessary to make the closed microphone 920 or the dual-link microphone 930 and the air conduction microphone 910 have a same amplitude-frequency response or phase-frequency response to mechanical vibration of the housing of the earphone.

For illustration purposes only, the air conduction microphones and vibration speakers mentioned in FIG. 9-A, FIG. 9-B and FIG. 9-C may be described as examples. A front cavity volume, a back cavity volume, and/or a cavity volume of the air conduction microphone or vibration sensor (e.g., the closed microphone 920 or the dual-link microphone 930)

may be changed to make the air conduction microphone and the vibration sensor have the same or almost the same amplitude-frequency response and/or phase-frequency response to vibration, thereby removing vibration and noises. The cavity volume herein refers to a sum of the front cavity volume and the back cavity volume of the microphone or the closed microphone. In some embodiments, when the amplitude-frequency response and/or phase-frequency response of the vibration sensor to vibration of the housing of the earphone is consistent with that of the air conduction microphone, the cavity volume of the vibration sensor may be regarded as the "equivalent volume" of the cavity volume of the air conduction microphone 910. In some embodiments, a closed microphone with a cavity volume that is the equivalent volume of the air conduction microphone cavity volume may be selected to facilitate the removal of the vibration noise signal of the air conduction microphone.

FIG. 10-A is a schematic diagram illustrating amplitude-frequency response curves of a vibration sensor with different cavity volumes according to some embodiments of the present disclosure. In some embodiments, the amplitude-frequency response curves of the vibration sensors with different cavity volumes to vibration may be obtained through finite element calculation methods or actual measurements. For example, the vibration sensor may be a closed microphone, and a bottom of the vibration sensor may be installed inside the earphone housing. As shown in FIG. 10-A, the horizontal axis denotes the vibration frequency, and the vertical axis denotes the amplitude-frequency response of the closed microphone to vibrations of different frequencies. The vibration may be generated by the vibration speaker in the earphone, and may be transmitted to the air conduction microphone or the vibration sensor through the housing and a connection structure. The solid line denotes the amplitude-frequency response curve of the air conduction microphone to vibration. The dotted lines denote the amplitude-frequency response curves of the closed microphone to vibration when a volume ratio of the closed microphone to the air conduction microphone cavity is 1:1, 3:1, 6.5:1, and 9.3:1. When the volume ratio is 1:1, the overall amplitude-frequency response curve of the closed microphone may be lower than that of the air conduction microphone. When the volume ratio is 3:1, the amplitude-frequency response curve of the closed microphone may increase, but the overall amplitude-frequency response curve may be still slightly lower than that of the air conduction microphone. When the volume ratio is 6.5:1, the overall amplitude-frequency response curve of the closed microphone may be slightly higher than that of the air conduction microphone. When the cavity volume ratio is 9.3:1, the overall amplitude-frequency response curve of the closed microphone may be higher than that of the air conduction microphone. It may be seen that when the cavity volume ratio is between 3:1 and 6.5:1, the amplitude-frequency response curves of the closed microphone and the air conduction microphone may be basically the same. Therefore, it may be considered that a ratio of the equivalent volume (i.e., the cavity volume of the closed microphone) to the cavity volume of the air conduction microphone may be between 3:1 and 6.5:1. In some embodiments, when the vibration sensor (e.g., the closed microphone 920) and the air conduction microphone (e.g., the air conduction microphone 910) receive vibration signals from a same vibration source, and a ratio of the cavity volume of the vibration sensor to the cavity volume of the air conduction microphone is between 3:1 and 6.5:1, the vibration sensor may help remove the vibration signal received by the air conduction microphone.

Similarly, FIG. 10-B is a schematic diagram illustrating phase-frequency response curves of a vibration sensor with different cavity heights according to some embodiments of the present disclosure. As shown in FIG. 10-B, the horizontal axis denotes the vibration frequency, and the vertical axis denotes the phase-frequency response of the closed microphone to vibration of different frequencies. As shown in FIG. 10-B, the solid line denotes the phase-frequency response curve of the air conduction microphone to vibration. The dotted lines denote the phase-frequency response curves of the closed microphone to vibration when a volume ratio of the closed microphone to the air conduction microphone cavity is 1:1, 3:1, 6.5:1, and 9.3:1. In some embodiments, when the closed microphone (e.g., the closed microphone 920) and the air conduction microphone (e.g., the air conduction microphone 910) receive vibration signals from the same vibration source, and a ratio of the cavity volume of the closed microphone to the cavity volume of the air conduction microphone is greater than 3:1, the closed microphone may help remove the vibration signal received by the air conduction microphone.

The above description of the equivalent volume of the air conduction microphone cavity volume is only a specific example, and should not be regarded as the only feasible implementation. Obviously, for those skilled in the art, after understanding the basic principles of air conduction microphones, it may be possible to make various modifications and changes to the specific structure of the microphone and/or vibration sensor without departing from the principles. However, these modifications and changes are still within the scope described above. For example, the equivalent volume of the cavity volume of the air conduction microphone may be changed through the modification of the structure of the air conduction microphone or the vibration sensor, as long as a closed microphone with a suitable cavity volume is selected to achieve the purpose of removing vibration and noises.

As described above, when the air conduction microphone has different structures, the equivalent volume of the cavity volume thereof may also be different. In some embodiments, factors affecting the equivalent volume of the cavity volume of the air conduction microphone may include the front cavity volume, the back cavity volume, the position of the opening, and/or the sound source transmission path of the air conduction microphone. Alternatively, in some embodiments, the equivalent volume of the front cavity volume of the air conduction microphone may be used to characterize the front cavity volume of the vibration sensor. The equivalent volume of the front cavity volume of the microphone herein may be described as when the back cavity volume of the vibration sensor is the same as the back cavity volume of the air conduction microphone, and the amplitude-frequency response and/or phase-frequency response of the vibration sensor to vibration of the housing of the earphone is consistent with that of the air conduction microphone, the front cavity volume of the vibration sensor may be the "equivalent volume" of the front cavity volume of the air conduction microphone. In some embodiments, a closed microphone with a back cavity volume equal to the back cavity volume of the air conduction microphone, and a front cavity volume being the equivalent volume of the front cavity volume of the air conduction microphone may be selected so as to help remove the vibration noise signal of the air conduction microphone.

When the air conduction microphone has different structures, the equivalent volume of the front cavity volume may also be different. In some embodiments, factors affecting the equivalent volume of the front cavity volume of the air conduction microphone may include the front cavity volume, the back cavity volume, the position of the opening, and/or the sound source transmission path of the air conduction microphone.

FIG. 11-A is a schematic diagram illustrating amplitude-frequency response curves of an air conduction microphone when a front cavity volume changes according to some embodiments of the present disclosure. In some embodiments, the amplitude-frequency response curves of the air conduction microphones with different front cavity volumes to vibration may be obtained through finite element calculation methods or actual measurements. As shown in FIG. 11-A, the horizontal axis denotes the vibration frequency, and the vertical axis denotes the amplitude-frequency response of the air conduction microphone to vibrations of different frequencies. $V_0$ denotes the front cavity volume of the air conduction microphone. As shown in FIG. 11-A, the solid line denotes the amplitude-frequency response curve of the air conduction microphone when the front cavity volume is $V_0$, and the dotted lines denote the amplitude-frequency response curves of the air conduction microphone when the front cavity volume is 2 $V_0$, 3 $V_0$, 4 $V_0$, 5 $V_0$, and 6 $V_0$, respectively. It may be seen from the figure that as the front cavity volume of the air conduction microphone increases, the amplitude of the diaphragm of the air conduction microphone may increase, and the diaphragm may be more likely to vibrate.

For air conduction microphones with different front cavity volumes, the equivalent volume of the front cavity volume of each air conduction microphone may be determined according to the corresponding amplitude-frequency response curve. In some embodiments, the equivalent volume of the front cavity volume may be determined according to a method similar to FIG. 10-A. For example, according to the corresponding amplitude-frequency response curves in FIG. 11-A, an equivalent volume of the front cavity volume of an air conduction microphone with a front cavity volume of 2 $V_0$ may be determined as 6.7 $V_0$ using the method of FIG. 10-A. That is, when the back cavity volume of the vibration sensor is equal to the back cavity volume of the air conduction microphone, the front cavity volume of the vibration sensor is 6.7$V_0$, and the front cavity volume of the air conduction microphone is 2$V_0$, the amplitude-frequency response of the vibration sensor to vibration may be the same as that of the air conduction microphone. As shown in Table 1, as the front cavity volume increases, the equivalent volume of the front cavity volume of the air conduction microphone may also increase.

TABLE 1

Equivalent volumes corresponding to different front cavity volumes

| | | | | | |
|---|---|---|---|---|---|
| Front Cavity Volume | 1 $V_0$ | 2 $V_0$ | 3 $V_0$ | 4 $V_0$ | 5 $V_0$ |
| Equivalent Volume | 4 $V_0$ | 6.7 $V_0$ | 8 $V_0$ | 9.3 $V_0$ | 12 $V_0$ |

Similarly, FIG. 11-B is a schematic diagram illustrating amplitude-frequency response curves of an air conduction microphone when a back cavity volume changes according to some embodiments of the present disclosure. In some embodiments, the amplitude-frequency response curves of the air conduction microphones with different back cavity volumes to vibration may be obtained through finite element calculation methods or actual measurements. As shown in FIG. 11-B, the horizontal axis denotes the vibration frequency, and the vertical axis denotes the amplitude-frequency response of the air conduction microphone to vibrations of different frequencies. $V_1$ denotes the back cavity volume of the air conduction microphone. As shown in FIG. 11-B, the solid line denotes the amplitude-frequency response curve of the air conduction microphone when the back cavity volume is 0.5 $V_1$, and the dotted lines denote the amplitude-frequency response curves of the air conduction microphone when the back cavity volume is 1 $V_1$, 1.5 $V_1$, 2 $V_1$, 2.5 $V_1$, and 3 $V_1$, respectively. It may be seen from the figure that as the volume of the back cavity of the air conduction microphone increases, the amplitude of the diaphragm of the air conduction microphone may increase, and the diaphragm may be more likely to vibrate. For air conduction microphones with different back cavity volumes, the equivalent volume of the front cavity volume of each air conduction microphone may be determined according to the corresponding amplitude-frequency response curve. In some embodiments, the equivalent volume of the front cavity volume may be determined according to a method similar to FIG. 10-A. For example, according to the solid line shown in FIG. 11-B, an equivalent volume of a front cavity volume of an air conduction microphone with a back cavity volume of 0.5 $V_1$ may be determined as 3.5 $V_0$ using the method of FIG. 10-A. That is, when the back cavity volumes of the air conduction microphone and the vibration sensor are both 0.5 $V_1$, the front cavity volume of the vibration sensor is 3.5 $V_0$, and the front cavity volume of the air conduction microphone is 1 $V_0$, the amplitude-frequency-frequency response of the vibration sensor to vibration may be the same as that of the air conduction microphone. As another example, when the back cavity volumes of the air conduction microphone and the vibration sensor are both 3.0 $V_1$, the front cavity volume of the vibration sensor is 7 $V_0$, and the front cavity volume of the air conduction microphone is 1 $V_0$, the amplitude-frequency-frequency response of the vibration sensor to vibration may be the same as that of the air conduction microphone. When the front cavity volume of the air conduction microphone remains unchanged at 1 $V_0$ and the back cavity volume increases from 0.5 $V_1$ to 3.0 $V_1$, the equivalent volume of the front cavity volume of the air conduction microphone may increase from 3.5 $V_0$ to 7 $V_0$.

Figure 12:
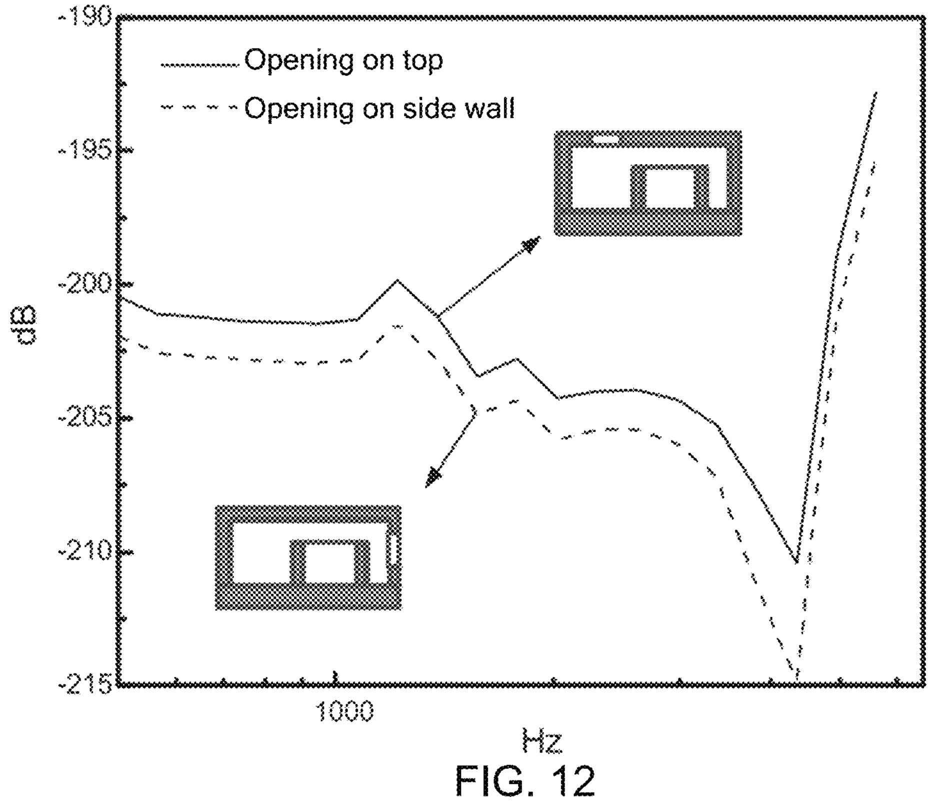
FIG. 12 is a schematic diagram illustrating amplitude-frequency response curves of a microphone with different opening positions according to some embodiments of the present disclosure.

In some embodiments, a position of the opening on the housing of the air conduction microphone may also affect the equivalent volume of the front cavity volume of the air conduction microphone. FIG. 12 is a schematic diagram illustrating amplitude-frequency response curves of a diaphragm corresponding to different opening positions according to some embodiments of the present disclosure. In some embodiments, the amplitude-frequency response curves of the air conduction microphone with different opening positions may be obtained through a finite element calculation method or actual measurement. As shown in the figure, the horizontal axis denotes the vibration frequency, and the vertical axis denotes the amplitude-frequency response of air conduction microphones with different opening positions to vibration. As shown in FIG. 12, the solid line denotes the amplitude-frequency response curve of the air conduction microphone with the opening on the top of the housing, and the dotted line denotes the amplitude-frequency response curve of the air conduction microphone with the opening on the side wall of the housing. It may be seen that the overall amplitude-frequency response of the air conduction microphone when the opening is on the top is higher than that of the air conduction microphone when the opening is on the side wall. In some embodiments, for air conduction microphones with different opening positions, the equivalent volume of a corresponding front cavity volume may be determined according to the corresponding amplitude-frequency response curve. The method for determining the equivalent volume of the front cavity volume may be same as the method in FIG. 10-A.

In some embodiments, the equivalent volume of the front cavity volume of the air conduction microphone with the opening at the top of the housing is greater than the equivalent volume of the front cavity volume of the air conduction microphone with the opening at the side wall. For example, the front cavity volume of the air conduction microphone with the top opening may be 1 $V_0$, the equivalent volume of the front cavity volume may be $4V_0$, and the equivalent volume of the front cavity volume of the air conduction microphone in a same size with an opening on the side wall may be about 1.5 $V_0$. The same size means that the front cavity volume and the back cavity volume of the air conduction microphone with an opening on the side wall may be respectively equal to the front cavity volume and the back cavity volume of the air conduction microphone with an opening on the top.

In some embodiments, transmission paths of the vibration source may be different, and the equivalent volumes of the front cavity volume of the air conduction microphone may also be different. In some embodiments, the transmission path of the vibration source may be related to the connection manner between the microphone and the housing of the earphone, and different connection manners between the microphone and the housing of the earphone may correspond to different amplitude-frequency responses. For example, when the microphone is connected in the housing through a peripheral connection, the amplitude-frequency response to vibration may be different from that of a side wall connection.

Figure 13:
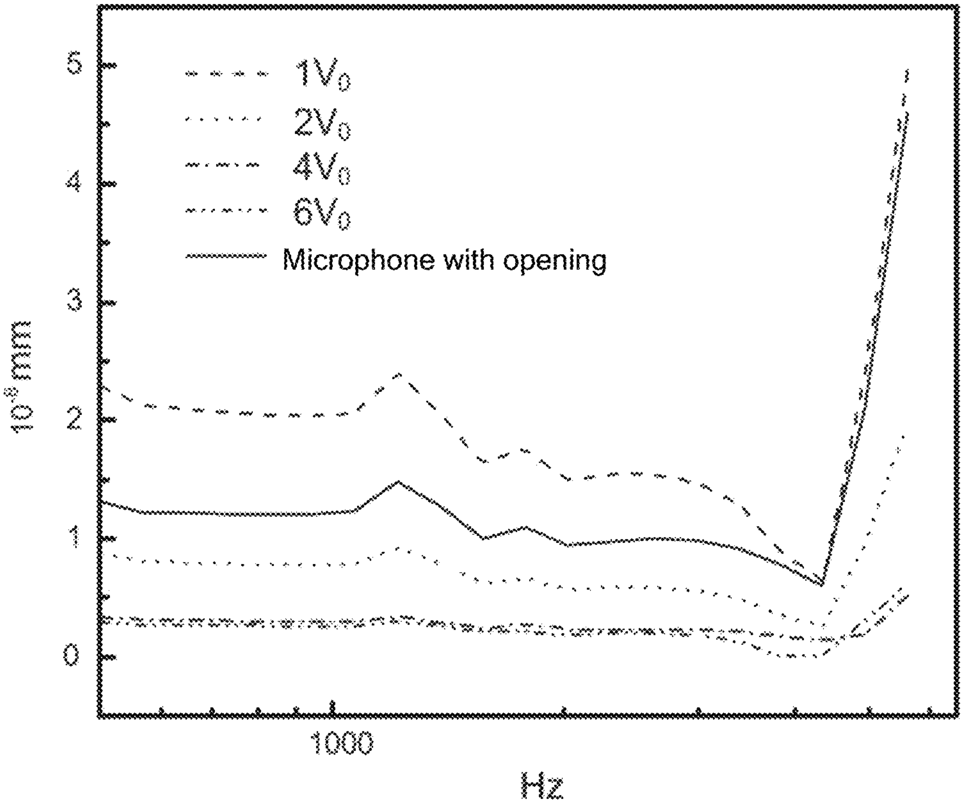
FIG. 13 is a schematic diagram illustrating amplitude-frequency response curves of an air conduction microphone and a fully enclosed microphone in a peripheral connection with a housing to vibration when a front cavity volume changes according to some embodiments of the present disclosure.

Different from the substrate connection to the housing in FIG. 10, FIG. 13 is a schematic diagram illustrating amplitude-frequency response curves of an air conduction microphone and a fully enclosed microphone in a peripheral connection with a housing to vibration when a front cavity volume changes according to some embodiments of the present disclosure. It should be noted that when discussing the front cavity volume of the air conduction microphone or the equivalent volume of the cavity volume, the connection manner of the air conduction microphone may be the same as the connection manner of the vibration sensor having a corresponding equivalent volume (an equivalent volume of the front cavity volume or an equivalent volume of the cavity volume). For example, in FIG. 7, FIG. 8 and FIG. 13, the air conduction microphone and the vibration sensor may be connected to the housing through a peripheral connection. As another example, the air conduction microphone and the vibration sensor in other embodiments of the present disclosure may be connected to the housing through a substrate connection, a peripheral connection, or other connection manners. In some embodiments, the amplitude-frequency response curve of the air conduction microphone and the fully enclosed microphone in a peripheral connection with a housing to vibration may be obtained through a finite element calculation method or actual measurement. As shown in FIG. 13, the solid line denotes the amplitude-frequency response curve of the air conduction microphone to vibration when the front cavity volume is $V_0$ and the air conduction microphone is connected to the housing through a peripheral connection. The dotted lines denote the amplitude-frequency response curves of the fully enclosed microphone to vibration when the fully enclosed microphone is connected to the housing through a peripheral connection and the front cavity volume is 1 $V_0$, 2 $V_0$, 4 $V_0$, 6 $V_0$, respectively. When the air conduction microphone with a front cavity volume of 1 $V_0$ is connected to the housing through a peripheral connection, the overall amplitude-frequency response curve may be lower than that of the fully enclosed microphone with a front cavity volume of 1 $V_0$ connected to the housing through a peripheral connection. When a fully enclosed microphone with a front cavity volume of 2 $V_0$ is connected to the housing through a peripheral connection, the overall amplitude-frequency response curve may be lower than that of the air conduction microphone with a front cavity volume of 1 $V_0$ connected to the housing through a peripheral connection. When the fully enclosed microphones with a front cavity volume of 4 $V_0$ and 6 $V_0$ are connected to the housing through a peripheral connection, the amplitude-frequency response curves may continue to decrease, which may be lower than the amplitude-frequency response curve of the air conduction microphone with a front cavity volume of 1 $V_0$ connected to the housing through a peripheral connection. It may be seen from the figure that when the front cavity volume of the fully closed microphone is between 1 $V_0$-2 $V_0$, the amplitude-frequency response curve of the fully closed microphone connected to the housing through a peripheral connection may be closest to the amplitude-frequency response curve of the air conduction microphone connected to the housing through a side wall connection. It may be concluded that if the air conduction microphone and the closed microphone are both connected to the housing through peripheral connections, the equivalent volume of the front cavity volume of the air conduction microphone may be between 1 $V_0$-2 $V_0$.

Figure 14:
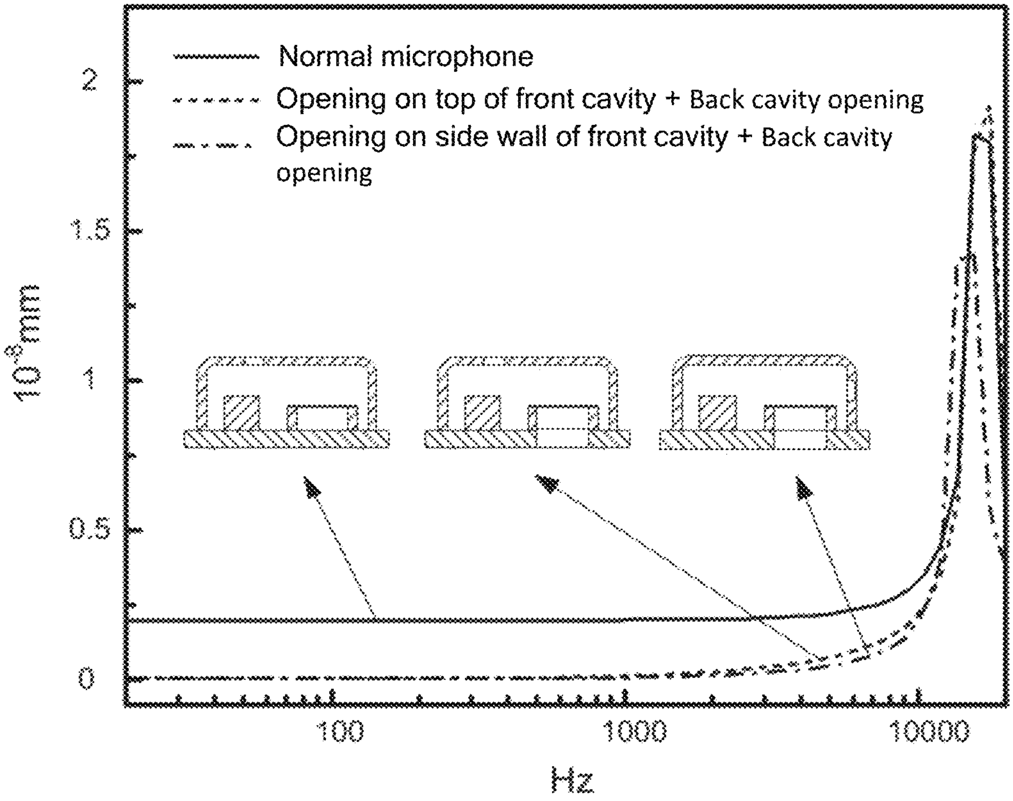
FIG. 14 is a schematic diagram illustrating amplitude-frequency response curves of an air conduction microphone and two dual-link microphones to an air-conducted sound signal according to some embodiments of the present disclosure.

FIG. 14 is a schematic diagram illustrating amplitude-frequency response curves of an air conduction microphone and two dual-link microphones to an air-conducted sound signal according to some embodiments of the present disclosure. Specifically, the solid line corresponds to the amplitude-frequency response curve of the air conduction microphone, and the dotted line corresponds to the amplitude-frequency response curve of the dual-link microphone with an opening on the top of the housing and the dual-link microphone with an opening on the side wall, respectively. As shown by the dotted line in the figure, when the frequency of the air-conducted sound signal is less than 5 kHz, the dual-link microphone may not respond to the air-conducted sound signal. When the frequency of the air-conducted sound signal exceeds 10 kHz, since a wavelength of the air-conducted sound signal gradually approaches a characteristic length of the dual-link microphone, and at the same time, a frequency of the air-conducted sound signal is close to or reaches a characteristic frequency of the diaphragm structure, the diaphragm may be caused to resonate to generate a relatively high amplitude, at this time the dual-link microphone may respond to the air-conducted sound signal. The characteristic length of the dual-link microphone herein may be a size of the dual-link microphone in one dimension. For example, when the dual-link microphone is a cuboid or approximately a cuboid, the characteristic length may be a length, a width or a height of the dual-link microphone. As another example, when the dual-link microphone is a cylinder or approximately a cylinder, the characteristic length may be a diameter or a height of the dual-link microphone. In some embodiments, the wavelength of the air-conducted sound signal is close to the characteristic length of a dual-link microphone, which may be understood as the wavelength of the air-conducted sound signal and the characteristic length of the dual-link microphone are on the same order of magnitude (e.g., on the order of mm). In some embodiments, a frequency band of voice communication may be in a range of 500 Hz-3400 Hz. The dual-link microphone may be insensitive to air-conducted sound in this range and may be used to measure vibration noise signals. Compared with closed microphones, the dual-link microphone may have better isolation effects on air-conducted sound signals in low frequency bands. In such cases, a dual-link microphone with a hole on the top of the housing or a side wall may be used as a vibration sensor to help remove the vibration noise signal in the air conduction microphone.

Figure 15:
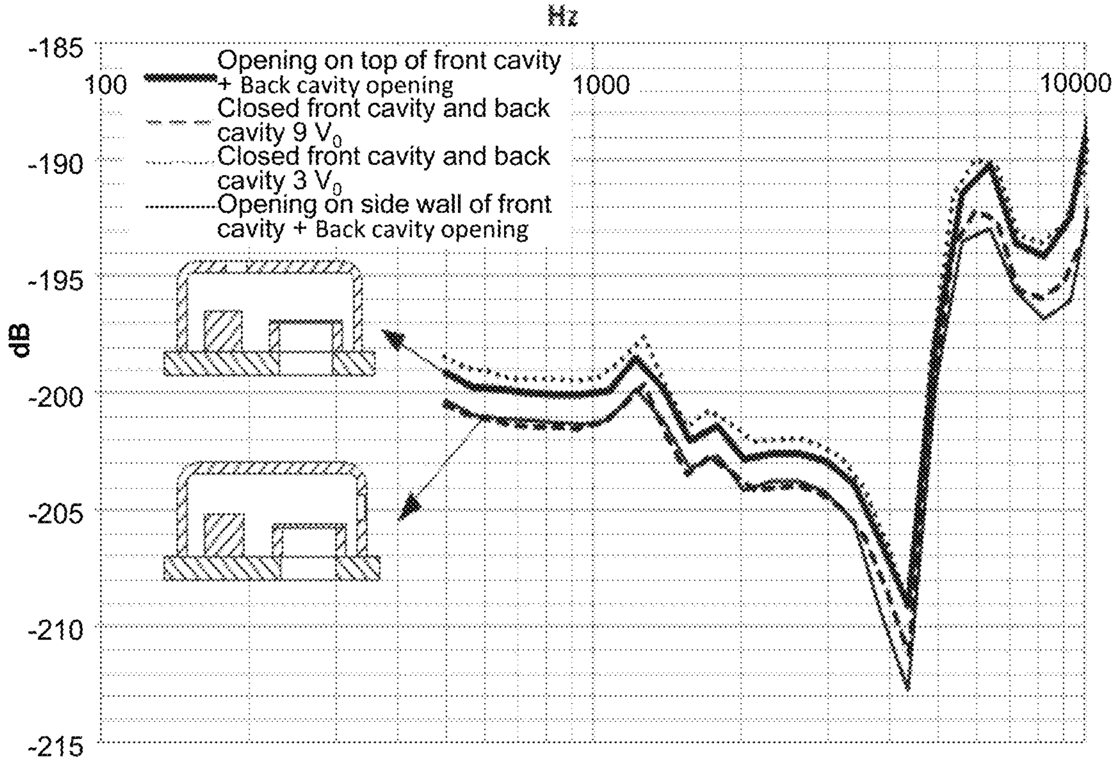
FIG. 15 is a schematic diagram illustrating amplitude-frequency response curves of a vibration sensor to vibration according to some embodiments of the present disclosure.

FIG. 15 is a schematic diagram illustrating amplitude-frequency response curves of a vibration sensor to vibration according to some embodiments of the present disclosure. The vibration sensor may include a closed microphone and a dual-link microphone. Specifically, FIG. 15 shows the amplitude-frequency response curves of two closed microphones and two dual-link microphones to vibration. As shown in FIG. 15, the thick solid line denotes the amplitude-frequency response curve of the dual-communication microphone with a front cavity volume of 1 $V_0$ and an opening on the top to vibration, and the thin solid line denotes the amplitude-frequency response curve of the dual-communication microphone with a front cavity volume of 1 $V_0$ and an opening on the side wall to vibration. The two dotted lines denote the amplitude-frequency response curves of closed microphones with front cavity volumes of 9 $V_0$ and 3 $V_0$ to vibration, respectively. It may be seen from the figure that the dual-link microphone with a front cavity volume of 1 $V_0$ and an opening on the side wall may be approximately "equivalent" to the closed microphone with a front cavity volume of 9 $V_0$. The dual-link microphone with a front cavity volume of 1 $V_0$ and an opening on the top may be approximately "equivalent" to the closed microphone with a front cavity volume of 3 $V_0$. Therefore, a dual-link microphone with a small volume may be used instead of a fully enclosed microphone with a large volume. In some embodiments, dual-link microphones and closed microphones that are "equivalent" or approximately "equivalent" to each other may be used interchangeably.

EXAMPLE 1

Figure 16:
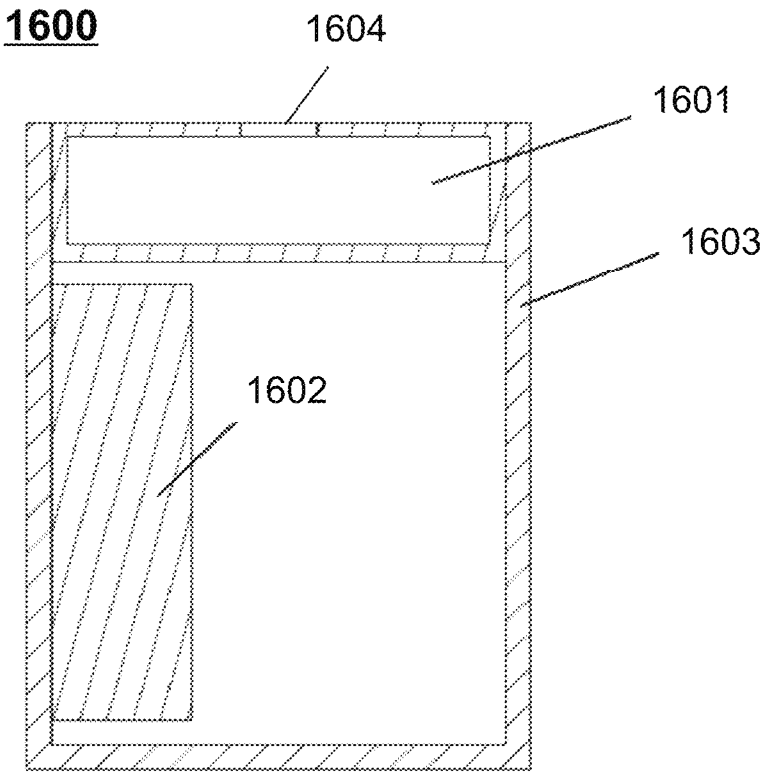
FIG. 16 is a schematic diagram illustrating a structure of a dual-microphone earphone according to some embodiments of the present disclosure.

As shown in FIG. 16, the earphone 1600 may include an air conduction microphone 1601, a bone conduction microphone 1602, and a housing 1603. As used herein, a sound hole 1604 of the air conduction microphone 1601 may communicate with the air outside the earphone 1600, and a side of the air conduction microphone 1601 may be connected to a side surface inside the housing 1603. The bone conduction microphone 1602 may be bonded to a side surface of the housing 1603. The air conduction microphone 1601 may obtain an air conduction sound signal through the sound hole 1604, and obtain a first vibration signal (i.e., a vibration noise signal) through a connection structure between the side and the housing 1603. The bone conduction microphone 1602 may obtain a second vibration signal (i.e., a mechanical vibration signal transmitted by the housing 1603). Both the first vibration signal and the second vibration signal may be generated by vibration of the housing 1603. In particular, because of the large differences between structures of the bone conduction microphone 1602 and the air conduction microphone 1601, the amplitude-frequency response and phase-frequency response of the two microphones may be different, the signal processing method shown in FIG. 2-A may be used to remove the vibration and noise signals.

EXAMPLE 2

Figure 17:
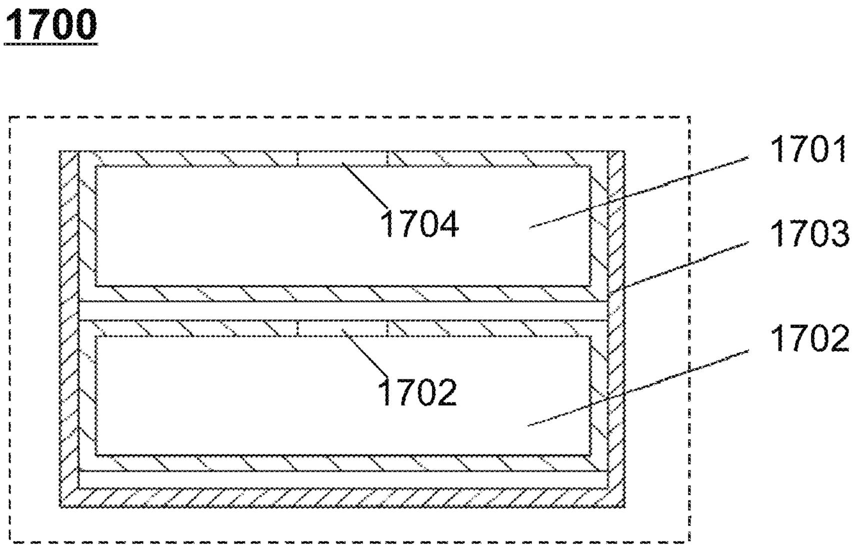
FIG. 17 is a schematic diagram illustrating a structure of a dual-microphone assembly according to some embodiments of the present disclosure.

As shown in FIG. 17, a dual-microphone assembly 1700 may include an air conduction microphone 1701, a closed microphone 1702, and a housing 1703. As used herein, the air conduction microphone 1701 and the closed microphone 1702 may be an integral component, and outer walls of the two microphones may be bonded to an inner side of the housing 1703, respectively. The sound hole 1704 of the air conduction microphone 1701 may communicate with the air outside the dual-microphone assembly 1700, and a sound hole 1702 of the closed microphone 1702 may be located at the bottom of the air conduction microphone 1701 and isolated from the outside air (equivalent to the closed microphone in FIG. 9-B). In particular, the closed microphone 1702 may use an air conduction microphone that is exactly the same as the air conduction microphone 1701, and from a closed structure in which the closed microphone 1702 does not communicate with the outside air through a structural design. The integrated structure may make the air conduction microphone 1701 and the enclosed microphone 1702 have the same vibration transmission path relative to a vibration source (e.g., the vibration speaker 101 in FIG. 1), such that the air conduction microphone 1701 and the enclosed microphone 1702 may receive the same vibration signal. The air conduction microphone 1701 may obtain an air conduction sound signal through the sound hole 1704, and obtain a first vibration signal (i.e., a vibration noise signal) through the housing 1703. The closed microphone 1702 may only obtain the second vibration signal (i.e., the mechanical vibration signal transmitted by the housing 1703). Both the first vibration signal and the second vibration signal may be generated by vibration of the housing 1603. In particular, a front cavity volume, a back cavity volume, and/or a cavity volume of the enclosed microphone 1702 may be determined accordingly to an equivalent volume of a corresponding volume (a front cavity volume, a back cavity volume, and/or a cavity volume) of the air conduction microphone 1701 such that the air conduction microphone 1701 and the closed microphone 1702 may have the same or approximately the same frequency response. The dual-microphone assembly 1700 may have the advantage of small volume, and may be individually debugged and obtained through a simple production process. In some embodiments, the dual-microphone assembly 1700 may remove vibration and noises in all communication frequency bands received by the air conduction microphone 1701.

Figure 18:
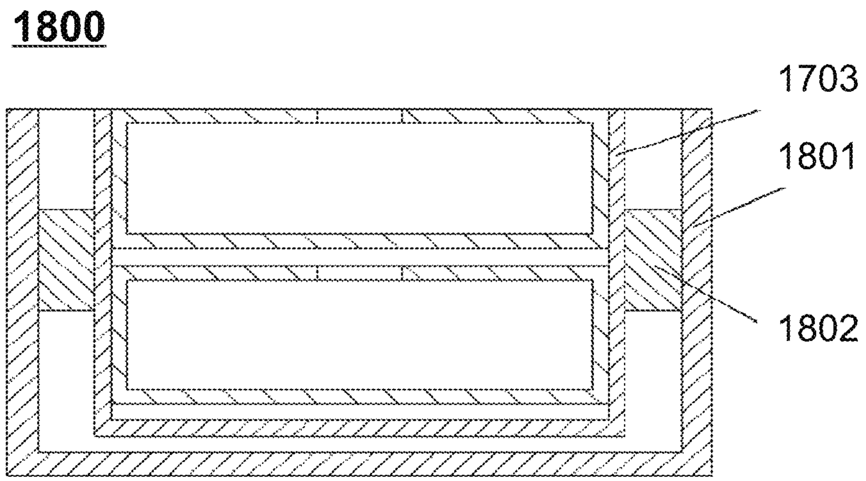
FIG. 18 is a schematic diagram illustrating a structure of a dual-microphone earphone according to some embodiments of the present disclosure.

FIG. 18 is a schematic diagram illustrating a structure of an earphone that contains the dual-microphone component in FIG. 17. As shown in FIG. 18, the earphone 1800 may include the dual-microphone assembly 1700, a housing 1801, and a connection structure 1802. The housing 1703 of components of the dual-microphone assembly 1700 may be connected to the housing 1801 through a peripheral connection. The peripheral connection may keep the two microphones in the dual-microphone assembly 1700 symmetrical with respect to the connection position on the housing 1801, thereby further ensuring that vibration transmission paths from the vibration source to the two microphones are the same. In some embodiments, the earphone structure in FIG. 18 may effectively eliminate influences of different transmission paths of vibration noises, different types of two microphones, etc. on removing the vibration noises.

EXAMPLE 3

Figure 19:
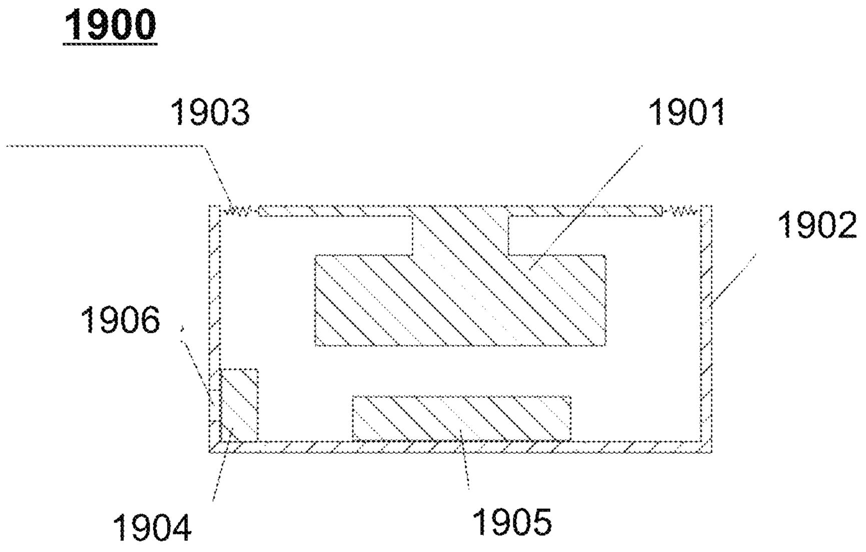
FIG. 19 is a schematic diagram illustrating a structure of a dual-microphone earphone according to some embodiments of the present disclosure.

FIG. 19 is a schematic diagram illustrating a structure of a dual-microphone earphone according to some embodiments of the present disclosure. As shown in FIG. 19, the earphone 1900 may include a vibration speaker 1901, a housing 1902, an elastic element 1903, an air conduction microphone 1904, a bone conduction microphone 1905, and an opening 1906. As used herein, the vibration speaker 1901 may be fixed on the housing 1902 through an elastic element 1903. The air conduction microphone 1904 and the bone conduction microphone 1905 may be respectively connected to different positions inside the housing 1902. The air conduction microphone 1904 may communicate with the outside air through the opening 1906 to receive air-conducted sound signals. When the vibration speaker 1901 vibrates and produces sound, the housing 1902 may be driven to vibrate, and the housing 1902 may transmit the vibration to the air conduction microphone 1904 and the bone conduction microphone 1905. In some embodiments, a signal processing method in FIG. 2-B may be used to remove the vibration noise signal received by the air conduction microphone 1904 using the vibration signal obtained by the bone conduction microphone 1905. In some embodiments, the bone conduction microphone 1905 may be used to remove vibration noises of all communication frequency bands received by the air conduction microphone 1904.

EXAMPLE 4

Figure 20:
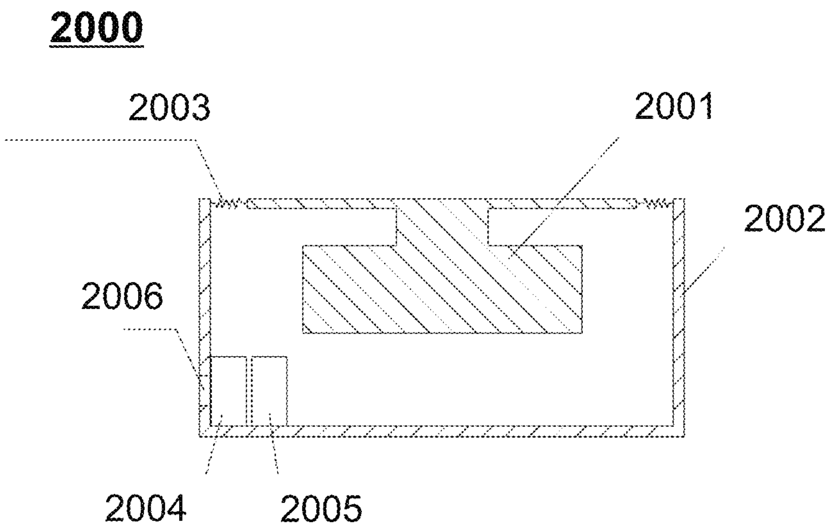

FIG. 20 is a schematic diagram illustrating a structure of a dual-microphone earphone according to some embodiments of the present disclosure. As shown in FIG. 20, the earphone 2000 may include a vibration speaker 2001, a housing 2002, an elastic element 2003, an air conduction microphone 2004, a vibration sensor 2005, and an opening 2006. The vibration sensor 2005 may be a closed microphone, a dual-connected microphone, or a bone conduction microphone as shown in some embodiments of the present disclosure, or may be other sensor devices with a vibration signal collection function. The vibration speaker 2001 may be fixed to the housing 2002 through the elastic element 2003. The air conduction microphone 2004 and the vibration sensor 2005 may be two microphones with the same amplitude-frequency response and/or phase-frequency response after selection or adjustment. A top and a side of the air conduction microphone 2004 may be respectively connected to the inside of the housing 2006, and a side of the vibration sensor 2005 may be connected to the inside of the housing 2006. The air conduction microphone 2004 may communicate with the outside air through the opening 2006. When the vibration speaker 2001 vibrates, it may drive the housing 2002 to vibrate, and the vibration of the housing 2002 may be transmitted to the air conduction microphone 2004 and the vibration sensor 2005. Since a position where the air conduction microphone 2004 is connected to the housing 2006 is very close to a position where the vibration sensor 2005 is connected to the housing 2006 (e.g., the two microphones may be located at positions 301 and 302 in FIG. 3, respectively), the vibration transmitted to the two microphones by the housing 2006 may be the same. In some embodiments, the vibration noise signal received by the air conduction microphone 2004 may be removed using a signal processing method as shown in FIG. 2-C based on the signals received by the air conduction microphone 2004 and the vibration sensor 2005. In some embodiments, the vibration sensor 2005 may be used to remove vibration noises in all communication frequency bands received by the air conduction microphone 2004.

EXAMPLE 5

Figure 21:
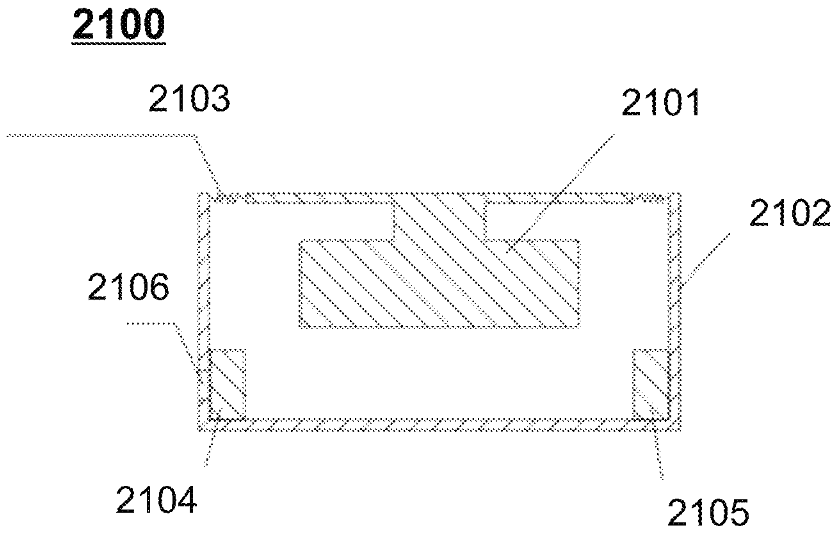
FIG. 21 is a schematic diagram illustrating a structure of a dual-microphone earphone according to some embodiments of the present disclosure.

FIG. 21 is a schematic diagram illustrating a structure of a dual-microphone earphone according to some embodiments of the present disclosure. The dual-microphone earphone 2100 may be another variant of the earphone 2000 in FIG. 20. The earphone 2100 may include a vibration speaker 2101, a housing 2102, an elastic element 2103, an air conduction microphone 2104, a vibration sensor 2105, and an opening 2106. The vibration sensor 2105 may be a closed microphone, a dual-link microphone, or a bone conduction microphone. The air conduction microphone 2104 and the vibration sensor 2105 may be respectively connected to the inner side of the housing 2102 through a peripheral connection, and may be symmetrically distributed with respect to the vibration speaker 2101 (e.g., the two microphones may be respectively located at positions 301 and 304 in FIG. 3). The air conduction microphone 2104 and the vibration sensor 2105 may be two microphones with the same amplitude-frequency response and/or phase-frequency response after selection or adjustment. In some embodiments, the vibration noise signal received by the air conduction microphone 2104 may be removed using the signal processing method shown in FIG. 2-C based on the signals received by the air conduction microphone 2104 and the vibration sensor 2105. In some embodiments, the vibration sensor 2105 may be used to remove vibration noises in all communication frequency bands received by the air conduction microphone 2104.

The basic concepts have been described above. Obviously, for those skilled in the art, the disclosure of the invention is merely by way of example, and does not constitute a limitation on the present disclosure. Although not explicitly stated here, those skilled in the art may make various modifications, improvements, and amendments to the present disclosure. These modifications, improvements and amendments are intended to be suggested by this disclosure, and are within the spirit and scope of the exemplary embodiments of this disclosure.

In addition, unless clearly stated in the claims, the order of processing elements and sequences, the use of numbers and letters, or the use of other names in the present disclosure are not used to limit the order of the procedures and methods of the present disclosure. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

At last, it should be understood that the embodiments described in the present disclosure are merely illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

We claim:

1. A microphone apparatus, comprising a microphone and a vibration sensor, wherein the microphone is configured to receive a first signal including a voice signal and a first vibration signal;

the vibration sensor is configured to receive a second vibration signal, the first vibration signal and the second vibration signal originating from a vibration of vibration source;

a cavity volume of the vibration sensor is larger than a cavity volume of the microphone; and the microphone and the vibration sensor are located at adjacent positions or at symmetrical positions with respect to the vibration source.

2. The microphone apparatus of claim 1, wherein the microphone, the vibration sensor, and at least a portion of the vibration source are located in a housing.

3. The microphone apparatus of claim 2, wherein a connection between the microphone and the housing or a connection between the vibration sensor and the housing includes a cantilever connection, a peripheral connection, or a substrate connection.

4. The microphone apparatus of claim 3, wherein the vibration sensor and the microphone are connected in the housing in a same manner.

5. The microphone apparatus of claim 4, wherein a dispensing position of the vibration sensor is the same as or close to a dispensing position of the microphone.

6. The microphone apparatus of claim 1, wherein an amplitude-frequency response of the vibration sensor to the second vibration signal is the same as an amplitude-frequency response of the microphone to the first vibration signal, and/or a phase-frequency response of the vibration sensor to the second vibration signal is the same as a phase-frequency response of the microphone to the first vibration signal.

7. The microphone apparatus of claim 1, wherein the cavity volume of the vibration sensor is proportional to a cavity volume of the microphone.

8. The microphone apparatus of claim 1, wherein a ratio of the cavity volume of the vibration sensor to the cavity volume of the microphone is in a range of 3:1 to 6.5:1.

9. The microphone apparatus of claim 1, further comprising a signal processing unit configured to make the first vibration signal offset with the second vibration signal and output the voice signal.

10. The microphone apparatus of claim 1, wherein the vibration sensor is a closed microphone or a dual-link microphone.

11. The microphone apparatus of claim 10, wherein the closed microphone has a closed front cavity and a closed back cavity.

12. The microphone apparatus of claim 10, wherein the dual-link microphone has an open front cavity and an open back cavity.

13. The microphone apparatus of claim 1, wherein the microphone is a front cavity opening earphone or a back cavity opening earphone.

14. The microphone apparatus of claim 13, wherein the front cavity opening earphone includes at least one opening on a top or a side wall of a front cavity.

15. The microphone apparatus of claim 1, wherein the microphone and the vibration sensor are both micro-electromechanical system microphones.

16. An earphone system, comprising:

a speaker, a microphone, a vibration sensor, and a housing, the speaker, the microphone, and the vibration sensor being located in the housing, wherein the microphone is configured to receive a first signal including a voice signal and a first vibration signal;

the vibration sensor is configured to receive a second vibration signal, and the first vibration signal and the second vibration signal originating from a vibration of the speaker;

a cavity volume of the vibration sensor is larger than a cavity volume of the microphone; and the microphone and the vibration sensor are located at adjacent positions on the housing or at symmetrical positions on the housing with respect to the speaker.

17. The earphone system of claim 16, wherein a connection between the microphone and the housing or a connection between the vibration sensor and the housing includes a cantilever connection, a peripheral connection, or a substrate connection.

18. The earphone system of claim 17, wherein the vibration sensor and the microphone are connected in the housing in a same manner.

19. The earphone system of claim 18, wherein a dispensing position of the vibration sensor is the same as or close to a dispensing position of the microphone.

20. The earphone system of claim 16, wherein an amplitude-frequency response of the vibration sensor to the second vibration signal is the same as an amplitude-frequency response of the microphone to the first vibration signal, and/or a phase-frequency response of the vibration sensor to the second vibration signal is the same as a phase-frequency response of the microphone to the first vibration signal.

* * * * *